(12) United States Patent
Reid et al.

(10) Patent No.: US 11,585,428 B2
(45) Date of Patent: Feb. 21, 2023

(54) COLD START LUBRICANT DISTRIBUTION SYSTEMS AND WORK VEHICLES INCLUDING THE SAME

(71) Applicant: Deere & Company, Moline, IL (US)

(72) Inventors: David G. Reid, Cedar Falls, IA (US); Marcus L. Kuhl, Cedar Falls, IA (US); Brett D. McClain, Hudson, IA (US)

(73) Assignee: DEERE & COMPANY, Moline, IL (US)

( * ) Notice: Subject to any disclaimer, the term of this patent is extended or adjusted under 35 U.S.C. 154(b) by 158 days.

(21) Appl. No.: 17/014,562

(22) Filed: Sep. 8, 2020

(65) Prior Publication Data
US 2022/0074484 A1 Mar. 10, 2022

(51) Int. Cl.
*F16H 57/04* (2010.01)
*F16N 7/38* (2006.01)
(Continued)

(52) U.S. Cl.
CPC ......... *F16H 57/0435* (2013.01); *B60K 17/04* (2013.01); *B60K 17/22* (2013.01);
(Continued)

(58) Field of Classification Search
CPC ............. F16H 57/0412; F16H 57/0413; F16H 57/0435; F16H 57/0483; F16N 7/38; F16N 39/00; F16N 2270/56
See application file for complete search history.

(56) References Cited

U.S. PATENT DOCUMENTS 5,060,760 A * 10/1991 Long ............... F16C 19/52
184/7.4
6,899,074 B1 5/2005 Carlsson
(Continued)

FOREIGN PATENT DOCUMENTS

DE 102007018504 A1 10/2008
FR 8057917 A1 4/2018
(Continued)

OTHER PUBLICATIONS

German Search Report issued in application No. DE102021208069.3, dated May 20, 2022, 04 pages.

*Primary Examiner* — Minh Truong
(74) *Attorney, Agent, or Firm* — Klintworth & Rozenblat IP LLP

(57) ABSTRACT

Embodiments of a cold start lubricant distribution system include a lubricant distribution circuit, which fluidly interconnects first and second actively-lubricated work vehicle assemblies onboard a work vehicle. A flow divider section is included in the lubricant distribution circuit and through which lubricant flow is apportioned between the first and second actively-lubricated work vehicle assemblies. A lubricant supply pump is further located in the lubricant distribution circuit upstream of the flow divider section. The cold start lubricant distribution system further includes a lubricant flow modification assembly operably in a cold start mode. When operating in the cold start mode, the lubricant flow modification assembly reduces a volume of lubricant flow supplied to the first actively-lubricated work vehicle assembly through the flow divider section relative to a
(Continued)

volume of lubricant flow supplied to the second actively-lubricated work vehicle assembly through the flow divider section.

14 Claims, 7 Drawing Sheets

(51) Int. Cl.
| | | |
|---|---|---|
| *F16N 39/00* | (2006.01) | |
| *B60K 17/04* | (2006.01) | |
| *B60K 17/22* | (2006.01) | |
| *B62D 49/06* | (2006.01) | |

(52) U.S. Cl.
CPC ..... *F16H 57/0412* (2013.01); *F16H 57/0413* (2013.01); *F16H 57/0467* (2013.01); *F16N 7/38* (2013.01); *F16N 39/00* (2013.01); *B62D 49/06* (2013.01); *F16H 57/0483* (2013.01); *F16N 2200/10* (2013.01); *F16N 2210/04* (2013.01); *F16N 2270/56* (2013.01); *F16N 2280/00* (2013.01)

(56) References Cited

U.S. PATENT DOCUMENTS

| | | | | |
|---|---|---|---|---|
| 2002/0128107 | A1* | 9/2002 | Wakayama | ......... F16H 57/0412 |
| | | | | 475/161 |
| 2008/0006483 | A1* | 1/2008 | Parnin | ................. F16N 29/00 |
| | | | | 184/6 |
| 2011/0042177 | A1* | 2/2011 | Bauer | ................. F16D 48/0206 |
| | | | | 192/85.61 |
| 2012/0247911 | A1* | 10/2012 | Noda | ................. B60K 6/365 |
| | | | | 192/113.32 |
| 2012/0266970 | A1 | 10/2012 | Ramler | |
| 2015/0192150 | A1* | 7/2015 | Matsushita | ........... B60W 10/30 |
| | | | | 60/420 |
| 2016/0144860 | A1 | 5/2016 | Naito et al. | |
| 2016/0208900 | A1* | 7/2016 | Shoemaker | ............. F16H 48/08 |
| 2019/0128399 | A1* | 5/2019 | Shin | ................. F16H 57/0412 |

FOREIGN PATENT DOCUMENTS

| | | |
|---|---|---|
| GB | 1222372 A | 2/1971 |
| IE | 65047 B1 | 10/1995 |

\* cited by examiner

COLD START LUBRICANT DISTRIBUTION SYSTEMS AND WORK VEHICLES INCLUDING THE SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to cold start lubricant distribution systems and work vehicles including cold start lubricant distribution systems, which mitigate lubricant stacking, accelerate lubricant warming, or provide a combination of such effects when operating in a cold start mode.

BACKGROUND OF THE DISCLOSURE

Work vehicles commonly include multiple actively-lubricated assemblies, which share a circulated oil (or other liquid lubricant) during work vehicle operation. For example, tractors and other work vehicles may include actively-lubricated front and rear axle assemblies, as well as an actively-lubricated transmission, which are fluidly interconnected through an oil distribution circuit. During work vehicle operation, oil is circulated through the oil distribution circuit utilizing at least one oil supply pump, such as a fixed displacement pump driven through the gearing of the work vehicle transmission. Additionally, in certain cases, one or more of the actively-lubricated assemblies may include a housing having an air cavity, which is pressurized to urge oil outflow from the housing and through a standpipe or other outlet conduit. Generally, such oil sharing schemes concurrently avail multiple work vehicle assemblies of a common, larger volume, high quality oil supply, which is filtered, cooled, or otherwise conditioned during work vehicle operation. This, in turn, helps maintain optimal lubrication of moving components, such as rotating axles and gears, within the work vehicle assemblies to prolong component lifespan and reduce maintenance requirements of the work vehicle.

SUMMARY OF THE DISCLOSURE

Embodiments of the cold start lubricant distribution system are utilized onboard a work vehicle having first and second actively-lubricated work vehicle assemblies. In at least some embodiments, the cold start lubricant distribution system includes a lubricant distribution circuit fluidly interconnecting the first and second actively-lubricated work vehicle assemblies. A flow divider section is included in the lubricant distribution circuit and through which lubricant flow is apportioned between the first and second actively-lubricated work vehicle assemblies. A lubricant supply pump is further located in the lubricant distribution circuit upstream of the flow divider section. The cold start lubricant distribution system further includes a lubricant flow modification assembly operably in a cold start mode. When operating in the cold start mode, the lubricant flow modification assembly reduces a volume of lubricant flow supplied to the first actively-lubricated work vehicle assembly through the flow divider section relative to a volume of lubricant flow supplied to the second actively-lubricated work vehicle assembly through the flow divider section.

In further embodiments, the cold start lubricant distribution system includes a lubricant distribution circuit having a flow divider section, first and second actively-lubricated work vehicle assemblies fluidly interconnected by the lubricant distribution circuit, a lubricant supply pump located in the lubricant distribution circuit. When active, the lubricant supply pump urges lubricant flow through the flow divider section of the lubricant distribution circuit. Further contained in the cold start lubricant distribution system further includes, a lubricant flow modification assembly includes a shutoff valve movable between an open position and a closed position, a valve actuator controllable to move the shutoff valve from the open position to the closed position, and a controller coupled to the valve actuator. When in the closed position, the shutoff valve blocks lubricant flow to the first actively-lubricated work vehicle assembly. The controller is configured to: (i) determine when to place the lubricant flow modification assembly in a cold start mode, and (ii) command the actuator to move the shutoff valve into the closed position when placing the lubricant flow modification assembly in the cold start mode.

Embodiments of a work vehicle equipped with a cold start lubricant distribution system are further disclosed. In various implementations, the work vehicle includes an actively-lubricated front axle assembly, an actively-lubricated rear axle assembly, and a cold start lubricant distribution system. The cold start lubricant distribution system includes, in turn, a lubricant distribution circuit fluidly interconnecting the actively-lubricated front and rear axle assemblies, a flow divider section included in the lubricant distribution circuit and through which lubricant flow is apportioned between the actively-lubricated front and rear axle assemblies, and a lubricant supply pump located in the lubricant distribution circuit upstream of the flow divider section of the lubricant distribution circuit. The cold start lubricant distribution system further includes a lubricant flow modification assembly operable in a cold start mode. When operating in the cold start mode, the lubricant flow modification assembly reduces a volume lubricant flow supplied to the actively-lubricated front axle assembly through the flow divider section relative to a volume of lubricant flow supplied to the actively-lubricated rear axle assembly through the flow divider section.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
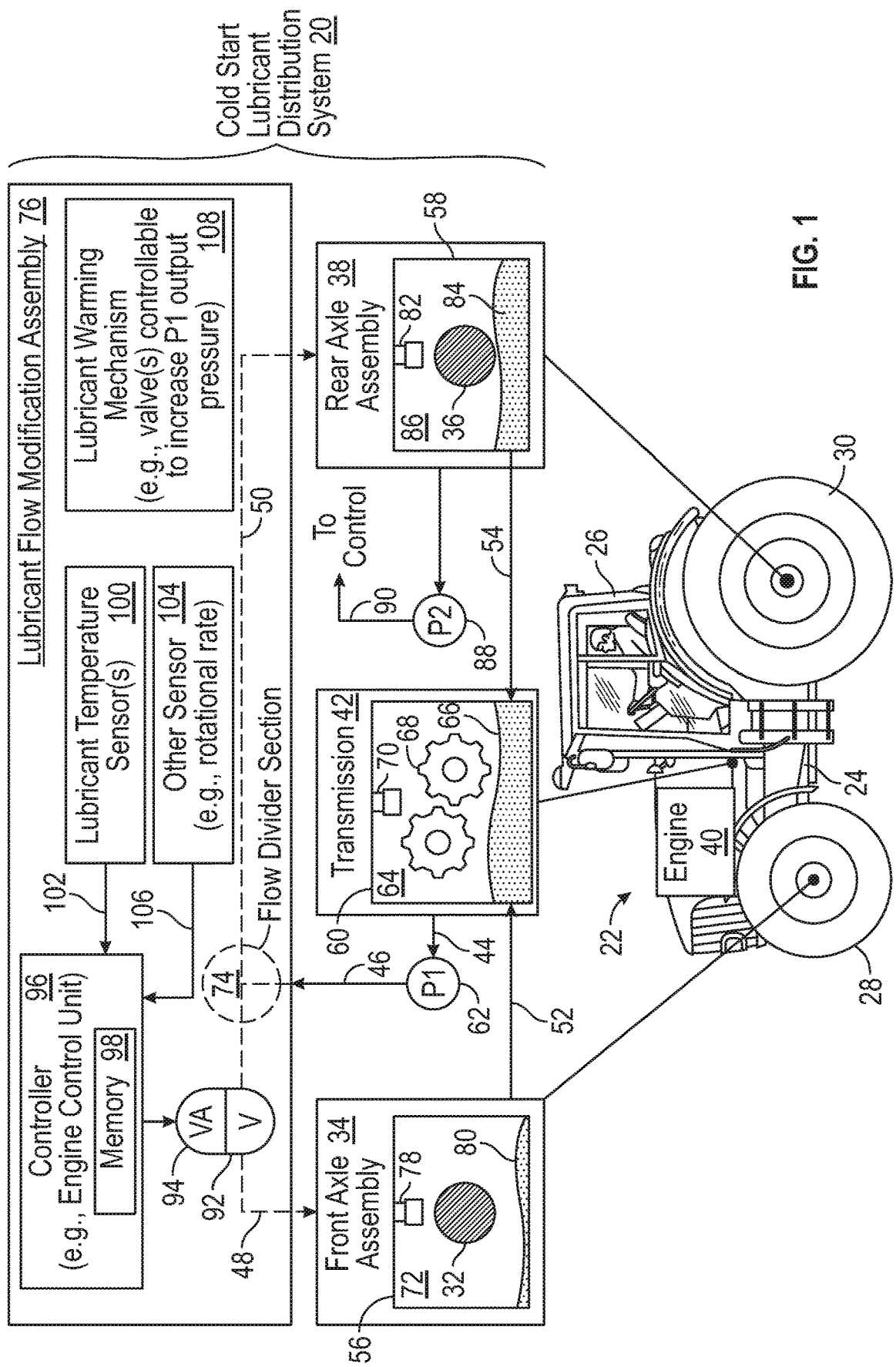
FIG. 1 is a schematic of a work vehicle (here, a tractor) equipped with a cold start lubricant distribution system, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As discussed above, shared lubricant distribution systems are commonly deployed onboard work vehicles and utilized to circulate a liquid lubricant, such as oil, through multiple lubricated assemblies containing rotating components, such as rotors, axles, gears, bearings, and the like. While providing several advantages, shared lubricant distribution systems also encounter limitations associated with lubricant routing between various assemblies, particularly when a circulated lubricant cools to a relatively low temperature and become highly viscous or thick. As a circulated lubricant is typically warmed by various sources of heat generation during work vehicle operation, issues relating to the flow of cold, viscous lubricant principally occur during and immediately following startup after a prolonged period of work vehicle inactivity in low temperature ambient conditions. Such conditions are referred to herein as "cold start conditions." Given the high viscosity of the lubricant under cold start conditions, it can be difficult to maintain a desired distribution of lubricant throughout the lubricant distribution circuit and the actively-lubricated work vehicle assemblies. Undesired accumulation or "stacking" of the cold, viscous lubricant may occur within certain actively-lubricated work vehicle assemblies, while the lubricant levels within other actively-lubricated assemblies become undesirably low. Such issues may arise in the case of, for example, a lubricant distribution system in which a circulated oil is shared by a front axle (FA) assembly, a rear axle (RA) assembly, and a transmission onboard a tractor or other work vehicle. Under cold start conditions, undesired accumulation or stacking of the oil may occur within the housing of the FA assembly for reasons explained below. Due to oil stacking with the FA assembly, the oil volume within either or both the RA assembly and the transmission may be reduced to undesirably low levels. Such low oil levels within the RA assembly and transmission can result in inadequate lubrication of rotating components and exacerbated component wear. Additionally, other issues may also arise from the temporary depletion of oil reserves within these regions of the work vehicle; e.g., in embodiments in which pressurized control oil is drawn from the RA assembly (thus serving as the drivetrain reservoir), the control oil supply may be affected in a manner reducing the responsiveness of clutches and other hydraulically-actuated components onboard the work vehicle.

Oil stacking under cold start conditions can be addressed, to a certain extent, by simply increasing the total volume of oil within the lubricant distribution system available for circulation. Such a solution is less than ideal, however, for several reasons. Enlarging the volume of oil within the lubricant distribution system tends to increase maintenance costs, while reducing work vehicle performance due to increased (e.g., windage) losses. Further, enlarging the oil volume within the lubricant distribution system increases work vehicle base weight and often fails to reliably prevent the occurrence of undesirably low oil levels across all actively-lubricated assemblies under cold start conditions. Another relatively straightforward approach to help mitigate oil (or other lubricant) stacking under cold start conditions arises when oil outflow from a particular assembly casing or housing (e.g., the below-described FA assembly housing) is assisted by pressurizing an air cavity within the housing. In this case, the air pressure within the air cavity can potentially be boosted to expel the oil, even when relatively cold and viscous, from the housing at a higher flow rate. In practice, however, this solution is again less than ideal. First, substantial increases in air pressure are typically required to maintain an adequate outflow of highly viscous oil from a given housing under cold start conditions. Not only do energy usage inefficiencies result from generating such high air pressures, but the likelihood of various undesirable outcomes (e.g., degraded oil quality and decreased responsiveness when utilizing the circulated oil for control purposes) increase due to excessive aeration of the circulated oil.

An industrial demand thus persists for improved lubricant sharing or distribution systems, which are suitable for usage onboard work vehicles and which overcome the above-described issues encountered under cold start conditions. In satisfaction of this demand, the following describes cold start lubricant distribution systems and work vehicles including such lubricant distribution systems, which are operable in unique cold start modes. When operating in the cold start mode, the lubricant distribution system provides a lubricant anti-stacking function, an accelerated lubricant warming function, or both anti-stacking and accelerated lubricant warming functions. With respect to the anti-stacking function, in particular, embodiments of the lubricant distribution system selectively prevent, or at least significantly reduce, lubricant flow to at least one actively-lubricated assembly when placed in the cold start mode, which is otherwise prone to lubricant stacking. In certain embodiments, this may be accomplished utilizing a shutoff valve positioned downstream of a flow divider section included in the flow distribution circuit. Under normal operating conditions, the flow divider section receives lubricant flow drawn from the transmission and apportions the lubricant flow between two or more actively-lubricated assemblies of the work vehicle. When moved into a closed position, the shutoff valve prevents or substantially prevents lubricant flow from a lubricant supply pump, through the flow divider section, and to the work vehicle assembly prone to undesired lubricant build-up or stacking. Additionally, in certain embodiments, a bypass channel may enable a controlled minimum lubricant flow to bypass the shutoff valve and thereby maintain a desired minimal volume of lubricant flow to the stacking-prone assembly (or assemblies) when the lubricant distribution system operates in the cold start mode.

In addition to or in lieu of the above-described anti-stacking function, the cold start lubricant distribution system may provide an accelerated lubricant warming function when placed in the cold start mode. In embodiments, lubricant warming can be accelerated by directing the lubricant through one or more conduits warmed by heating elements, such as heating coils embedded in flow passage walls or surrounding pipes through which the lubricant passes. The integration of such heating elements into the lubricant distribution system may be associated with certain drawbacks, however, such as added cost and complexity. For at least this reason, embodiments of the cold start lubricant distribution system may leverage the lubricant supply pump itself to serve as a heating element by temporarily boosting the pump output pressure when the lubricant distribution system operates in the cold start mode. In particular, the cold start lubricant distribution system may include a unique combination of valves, which modulate to increase the flow resistance from the lubricant supply pump to one or more work vehicle assemblies under cold start conditions.

In implementations in which the cold start lubricant distribution system provides the above-described anti-stacking functionality utilizing a shutoff valve, for example, the lubricant distribution system may further include a variable flow control valve, which modulates to increase the flow resistance from the lubricant supply pump to a stacking-tolerant assembly (e.g., an RA assembly) when the shutoff valve is in the closed position. In certain cases, the variable flow control valve can be a pressure balance valve having an inlet coupled to the lubricant supply pump, a first outlet coupled to a stacking-prone (e.g., FA) assembly, and a second outlet coupled to a stacking-tolerant (e.g., RA) assembly. The spool (or other valve element) of the variable flow control valve translates to increase flow resistance from the inlet to the second outlet as the pressure appearing at the first outlet increases due to shutoff valve closure. In this manner, the spool of the pressure balance valve may automatically or reactively shift to a position increasing flow resistance from the lubricant supply pump to the stacking-tolerant (e.g., RA) assembly in conjunction with closure of the shutoff valve, thereby requiring the lubricant supply pump to apply increased energy into the lubricant to drive continued circulation through the lubricant distribution circuit. As a corollary, the lubricant temperature increases at a greater rate than would otherwise occur if the pump outlet pressure were not raised in this manner. The desired anti-stacking and accelerated lubricant warming functions are consequently accomplished jointly and tied to a single casual event, namely, the closure of the shutoff valve. Further, in certain embodiments, the variable flow control and the shutoff valve may function in conjunction with at least one pressure relief valve in embodiments, the cracking pressure of which can be set to accelerate or decelerate the rate of lubricant warming in the cold start mode, as further discussed below.

The valves and other components of the cold start lubricant distribution system, which are utilized to selectively place the lubricant distribution system in a cold start mode, are collectively referred to herein as a "lubricant flow modification assembly." This terminology is utilized to indicate that, when the lubricant distribution system operates in the cold start mode, the components of the lubricant flow modification assembly cooperate to alter the lubricant flow parameters (through a variation in routing, local fluid pressures, or both) to provide the anti-stacking function and/or the accelerated lubricant warming function, as described above. The lubricant flow modification assembly may also include any number of other fluidly-interconnected valves in addition to the above-mentioned shutoff valve and/or pressure balance valve. For example, as noted above, the lubricant flow modification assembly may further include at least one pressure relief valve in embodiments. When provided, such a pressure relief valve may include an inlet, which is fluidly coupled between the first outlet of the pressure balance valve and an inlet of the shutoff valve. The pressure relief valve may normally reside in a closed state and open when the lubricant applied to the inlet of the pressure relief valve surpasses a predetermined threshold or "cracking pressure." The outlet of the pressure relief valve can be fluidly coupled to selected actively-lubricated assembly or combination of assemblies onboard the work vehicle, as further discussed below.

As previously indicated, embodiments of the cold start lubricant distribution system include a shutoff valve, which is moved into a closed position to block or restrict flow to at least one stacking-prone work vehicle assembly, such as an FA assembly of a tractor or other work vehicle. In such embodiments, the shutoff valve can be a thermostatic valve, which is moved into a closed position by action of a thermostatic valve actuator when a sensed lubricant temperature drops below a predetermined threshold. Thermostatic valve actuators suitable for performing this function are known and commercially available. Such thermostatic valve actuators may rely upon shape or volume changes of a temperature-responsive material (e.g., a wax or a shape memory alloy) to accomplish the desired temperature-actuated function, with the lubricant temperature sensed by exposing the temperature-responsive material to the lubricant flow or otherwise placing the temperature-responsive material in thermal communication therewith. The combination of such a shutoff valve and a thermostatic valve actuator (which may be integrated into a common housing) is referred to herein as a "thermostatic valve." Thermostatic valves are commonly self-resetting; and, therefore, can readily transition the shutoff valve between closed and open states across repeated thermal cycles as the sensed lubricant temperature drops below and rises above a predetermined temperature threshold. In other instances, the shutoff valve may be transitioned between closed and open positions utilizing an actuator, such as a solenoid or other electric actuator, controlled utilizing an engine control unit (ECU) or another electronic controller. In this latter case, the controller may determine when to place the lubricant distribution system in the cold start mode; and, when so determining, command the actuator to move the shutoff valve into the closed position. The controller may determine when to place the lubricant distribution system in the cold start mode based upon current lubricant temperature (e.g., as detected by one or more lubricant temperature sensors in communication with the controller) and, perhaps, further based upon any number of additional inputs, such as sensor input indicative of a current rotational rate of the axle included in either or both the FA and RA assemblies.

Additional description of an example cold start flow distribution system, as deployed onboard an example work vehicle, will now be discussed in connection with FIGS. 1-10. In the below-described example embodiments, the cold start flow distribution system is described as regulating lubricant flow between first, second, and third actively-lubricated work vehicle assemblies in the form of an FA assembly, an RA assembly, and a transmission, respectively. This notwithstanding, it will be understood that the cold start flow distribution system can be utilized to supply lubricant flow to other types of actively-lubricated work vehicle assemblies in further embodiments including, but not limited to, various types of lubricated drivetrain boxes, e-machines (motors and generators), and other rotating shaft-supporting assemblies found onboard a wide range of work vehicles. Further, while principally described below in the context of a particular type of work vehicle (a tractor), embodiments of the cold start flow distribution system are amenable to integration into other types of work vehicles containing at least two actively-lubricated assemblies between which a circulated oil (or another lubricant) is shared, and regardless of whether the work vehicle is employed within an agricultural, construction, forestry, or mining industry, or another industrial context. Finally, while beneficially providing both anti-stacking and accelerated lubricant warming functions when operating in the cold start mode, embodiments of the cold start flow distribution system may provide only one of these functions (and possibly other complementary functions) when operating in the cold start mode in at least some instances.

Tractor Equipped with an Example Cold Start Lubricant Distribution System

Referring to FIG. 1, a cold start lubricant distribution system 20 onboard a tractor 22 is schematically shown in accordance with an example embodiment of the present disclosure. In addition to the cold start lubricant distribution system 20, the tractor 22 includes a body or chassis 24 and an operator station enclosed by a cabin 26. A pair of front wheels 28 and a pair of rear wheels 30 support the tractor chassis 24. The front wheels 28 are joined via a front axle 32, which extends transversely through a forward portion the tractor chassis 24 and which is included in an actively-lubricated front axle (FA) assembly 34. The rear wheels 30 are similarly joined via a rear axle 36, which extends transversely through a rear portion the tractor chassis 24 and which is included in an actively-lubricated rear axle (RA) assembly 38. An internal combustion engine 40, such as a heavy duty diesel engine, onboard the tractor 22 drives rotation of the rear axle 36, and therefore the rear wheels 28, through an actively-lubricated transmission assembly 42 (hereafter, the "transmission 42"). In certain cases, the tractor engine 40 may also drive rotation of the front axle 32 and the front wheels 28 through the transmission 42.

The actively-lubricated FA assembly 34, the actively-lubricated RA assembly 38, and the transmission 42 are fluidly interconnected by a lubricant distribution circuit 44, 46, 48, 50, 52, 54. The lubricant distribution circuit 44, 46, 48, 50, 52, 54 can include any combination of flow lines, such as pipes, flexible hosing segments, conduits integrated into a housing, and other such lubricant-conducting flow passages suitable for fluidly interconnected the various ports included in the respective housings of the actively-lubricated FA assembly 34, the actively-lubricated RA assembly 38, and the transmission 42 (identified in FIG. 1 by reference numerals 56, 58, and 60, respectively). As further discussed below, various other valves, filters, and other components are further disposed in the lubricant distribution circuit 44, 46, 48, 50, 52, 54. This includes at least one lubricant supply pump 62, which urges or helps urge lubricant flow through the lubricant distribution circuit 44, 46, 48, 50, 52, 54, as described below.

As noted above, the transmission 42 of the example tractor 22 includes a transmission housing 60. An air cavity 64 is provided in the transmission housing 60 at a location above a lubricant reservoir or sump 66, which collects in a lower portion of the transmission housing 60. Various components are contained in the transmission housing 60, such as gearing, clutches, rolling element bearings, and other rotating components 68, which are desirably lubricated by active lubricant flow during tractor operation. To provide active lubrication of the relevant transmission components 68, the transmission components 68 are contacted by a liquid lubricant, such as oil, which is dispensed into the transmission housing 60 through one or more orifices 70. The liquid lubricant is then distributed across various surfaces of the transmission components 68 by gravity flow, splash action resulting from component rotation, and similar actions. The lubricant collects or pools in a lower portion of transmission housing 60 to form the lubricant reservoir or sump 66, with a fraction of the pooled lubricant drawn off the transmission sump 66 utilizing the lubricant supply pump 62.

To enable the lubricant supply pump 62 to draw lubricant from the sump 66 of the transmission housing 60, an inlet of the lubricant supply pump 62 is fluidly connected to an outlet of the transmission housing 60 through a flow line 44 contained in the lubricant distribution circuit 44, 46, 48, 50, 52, 54. The term "flow line," as appearing herein, is refers to any conduit through which a liquid lubricant or another fluid (Including gasses) can flow. In various realizations, the lubricant supply pump 62 may be a fixed displacement pump driven through the gearing of the transmission 42. In alternative embodiments, the lubricant supply pump 62 may assume the form of a different pump type; and/or any number of additional pumps (e.g., one or more boost pumps) may be further included in the cold start lubricant distribution system 20 to further drive lubricant circulation through the lubricant distribution circuit 44, 46, 48, 50, 52, 54. Additionally, in embodiments, other means may also be employed to urge lubricant circulation through the lubricant distribution circuit 44, 46, 48, 50, 52, 54 including, for example, gravity flow and/or the application of pressurized air. In this latter regard, an air cavity 72 contained in the FA assembly housing 56 may be pressurized to help promote lubricant outflow from the housing 56 during operation of the cold start lubricant distribution system 20, as discussed more fully below in connection with FIG. 2.

Lubricant expelled by the lubricant supply pump 62, when active, is directed into a flow line 46 and is ultimately received at a flow divider section 74 included in a lubricant flow modification assembly 76. The lubricant flow modification assembly 76 is, in turn, included in the cold start lubricant distribution system 20 and is operable in a cold start mode in which the lubricant flow modification assembly 76 alters certain characteristics of the lubricant flow through the lubricant distribution circuit 44, 46, 48, 50, 52, 54, as further discussed below. As lubricant flows through the flow line 46, the flow divider section 74 splits or apportions this lubricant flow between first and second flow lines 48, 50, which are further included in the lubricant distribution circuit 44, 46, 48, 50, 52, 54. The flow line 48 conducts lubricant flow to an inlet of the FA assembly housing 56, with the lubricant then dispensed over and onto the front axle 32 and various other components contained in the FA assembly 34 (e.g., bearings supporting the front axle 32) via one or more orifices 78. Comparatively, the flow line 50 conducts lubricant flow to an inlet of the RA assembly housing 58, with the received lubricant directed over the front axle 32 and other components within the RA assembly 38 (e.g., bearings supporting the front axle 36), via at least one orifice 82. The flow divider section 74 can be produced from any number of components, including tee pipes or multi-way valves, suitable for apportioning the lubricant flow received via the flow line 46 (the main supply line) between the flow lines 48, 50 in at least a default operational mode of the lubricant flow modification assembly 76. In embodiments, the flow divider section 74 is realized utilizing a 3-way variable flow control valve and, perhaps, utilizing a 3-way pressure balance valve as discussed in detail below.

Some fraction of the lubricant introduced into the FA assembly housing 56 through the orifice or orifices 78 collects within the bottom of the housing 56 to form a lubricant pool 80. In certain embodiments, the cold start lubricant distribution system 20 may be configured to allow a moderate to large volume of lubricant to collect within the FA assembly housing 56 when, for example, the FA assembly housing 56 serves as a lubricant reservoir or repository from which lubricant (e.g., oil) is drawn for control purposes, as described in conjunction with the rear axle assembly 38. In the illustrated embodiment, however, it is desired to maintain a relatively low lubricant level within the FA assembly housing 56 such that the lubricant pool 80 has a minimize volume. In at least some embodiments, efficient outflow of lubricant from the FA assembly housing 56 may be promoted by pressurizing the air cavity 72 within the housing 56. Specifically, a pressurized air supply may be injected into the air cavity 72 to urge the outflow of lubricant from the FA assembly housing 56, through a standpipe or other outlet, and into a flow line 52 returning the lubricant to the sump 66 within the transmission housing 60.

In a manner similar to the FA assembly 34, lubricant is actively dispensed over the components (including the rear axle 36) contained in the RA assembly housing 58 via one or more orifices 82. However, in the case of RA assembly 38, the lubricant is permitted to collect within a lower portion of the RA assembly housing 58 to a greater volume to form a lubricant reservoir or sump 84, which is located beneath an air cavity 86. In the illustrated example, the FA assembly servers as the drivetrain reservoir such that lubricant contained in the sump 84 is drawn-off via action of a control lubricant pump 88 and directed into a control lubricant supply line 90. The lubricant conduced through the control lubricant supply line 90 is then delivered to various hydraulically-actuated (e.g., oil-actuated) components onboard the tractor 22, such as clutches, on an as-needed basis. Concurrently, lubricant is continually drawn from the sump 84 within the RA assembly housing 58 and returned to the sump 66 within the transmission housing 60 through a flow line 54 to complete the lubricant distribution circuit 44, 46, 48, 50, 52, 54.

Discussing now the lubricant flow modification assembly 76 in greater detail, the lubricant flow modification assembly 76 is operable in at least a default (standard) operational mode and a cold start mode. The lubricant flow modification assembly 76 can contain any combination of components suitable for performing a lubricant anti-stacking function, an accelerated lubricant warming function, or both anti-stacking and accelerated lubricant warming functions when operating in the cold start mode. In the illustrated example, the lubricant flow modification assembly 76 performs both these functions utilizing, for example, a unique valving arrangement capable of effectuating multiple flow modification actions in response to a single trigger event. Specifically, and by way of non-limiting example, the trigger event is movement of a 2-way shutoff valve 92 into a closed position. The shutoff valve 92 (and, more specifically, the valve element contained in the shutoff valve 92) is moved between open and closed positions utilizing a valve actuator 94, which may or may not be integrated into a common housing with the shutoff valve 92. In certain embodiments, the valve actuator 94 may be a thermostatic valve actuator, which is triggered to close the shutoff valve 92 when a sensed temperature (a current lubricant temperature or a temperature indicative of the current lubricant temperature) falls below a predetermined threshold. In other instances, the valve actuator 94 may be selectively commanded to move the shutoff valve 92 between open and closed states by a controller 96, such an ECU, further included in the lubricant flow modification assembly 76.

When included in the lubricant flow modification assembly 76, the controller 96 can assume any form suitable for performing the functions described throughout this document. Further, the term "controller," as appearing herein, is utilized in a non-limiting sense to generally refer to the processing architecture of the lubricant flow modification assembly 76; and, more broadly, of the cold start lubricant distribution system 20. The controller 96 can encompass or be associated with one or more processors, control computers, computer-readable memories, power supplies, storage devices, interface cards, and other standardized components. The controller 96 may also include or cooperate with any number of firmware and software programs or computer-readable instructions designed to carry-out the various process tasks, calculations, and control functions described herein. Such instructions or code may be stored within a computer-readable memory 98 included within or otherwise accessible to the controller 96. The memory 98 may also store other data useful in carrying-out the control algorithms described herein; and, specifically, utilized by the controller 96 in determining when to transition the lubricant flow modification assembly 76 from a default mode of operation to operation in the cold start mode, as further discussed below.

The controller 96 may determine when to place the lubricant flow modification assembly 76 in the cold start mode based upon one or more data inputs of varying types. Generally, the controller 96 will receive at least one data input indicative of a current lubricant temperature; that is, a temperature of the circulating lubricant as the lubricant passes through at least one location of the lubricant distribution circuit 44, 46, 48, 50, 52, 54. Accordingly, and as indicated in FIG. 1, the lubricant flow modification assembly 76 is usefully equipped with at least one lubricant temperature sensor 100, which monitors a lubricant temperature of the circulated lubricant at a selected location within the lubricant distribution circuit 44, 46, 48, 50, 52, 54; e.g., at a location downstream of the lubricant supply pump 62 and upstream of the RA assembly 38. The lubricant temperature sensor 100 provides data to the controller 96 indicative of the current lubricant temperature over a wired or wireless connection 102. The lubricant flow modification assembly 76 may further include one or more additional sensors 104, which provide data input to the controller 96 over a wired or wireless data connection 106, in embodiments in which the controller 96 considers such additional data inputs in determining when to transition the lubricant flow modification assembly 76 into the cold start mode of operation. Such additional sensor(s) 104 can include, for example, a rotational rate sensor or a similar sensor providing data indicative of a rotational rate of the front axle 32, the rear axle 36, or both. In alternative embodiments, the additional sensor(s) 104 can assume a different form (e.g., an ambient temperature sensor) or may be omitted from the lubricant flow modification assembly 76 and, more generally, from the cold start lubricant distribution system 20.

Finally, as noted above, the lubricant flow modification assembly 76 may contain one or more additional components forming a lubricant warming mechanism 108; that is, a mechanism by which the average temperature of the lubricant flowing within the lubricant distribution circuit 44, 46, 48, 50, 52, 54 can be increased at an accelerated rate when the lubricant flow modification assembly 76 operates in the cold start mode to hasten return of the lubricant flow modification assembly 76 to its default mode of operation. It is possible for the lubricant warming mechanism 108 to simply assume the form of one or more heating elements, which, when energized, provide heating of a conduit, assembly, or other structure through which the circulating lubricant flows. However, as noted above, the usage of such a lubricant warming mechanism is associated with various drawbacks. Notably, it has been recognized that the lubricant supply pump 62 itself can act as a heating element, in a conceptual sense, if the output pressure of the lubricant supply pump 62 is increased independently of the pump displacement. Accordingly, in embodiments, the lubricant warming mechanism 108 may be realized utilizing one or more valves, which can bring about such a pressure increase at the outlet of the lubricant supply pump 62 when the lubricant flow modification assembly 76 is placed in the cold start mode. Thus, in such instances, the lubricant warming mechanism 108 may be considered an indirect warming device, which induces lubricant warming by forcing the lubricant supply pump 62 to expend greater amounts of energy or power to drive lubricant circulation, thereby accelerating lubricant warming. In certain cases, the valve(s) included in the lubricant warming mechanism can be controlled by the controller 96 in a manner similar to the shutoff valve 92. In other embodiments, the valve(s) included in the lubricant warming mechanism 108 may modulate in a reactive or automated manner in response to pressure variations resulting from the closure of the shutoff valve 92, as discussed more fully below. This advantageously ties the anti-stacking and accelerated lubricant warming functions to a single event (shutoff valve closure), while reducing system complexity and cost by eliminating the need for actuator(s) associated with the valve(s) of the lubricant warming mechanism 108, when included in the lubricant flow modification assembly 76.

Absent the provision of the lubricant flow modification assembly 76, lubricant stacking can occur within the FA assembly 34 under cold start conditions. Specifically, due to the highly viscous state of the lubricant (e.g., oil) under such conditions, undesirably large volumes of the lubricant may collect within the FA assembly housing 56 due to an increased resistance to return flow to the transmission housing 60 and a reduced effectiveness in evacuating the FA assembly housing 56 of the viscous or thick lubricant by pressurizing the air cavity 72. Lubricant stacking within the FA assembly housing 56 reduces the volume of lubricant available for supply to the transmission 42 and the RA assembly 38, which can lead to various issues. As previously discussed, such issues range from inadequate lubrication of the components within transmission housing 60 and the RA assembly housing 58; to inadequate lubricant supply to the pumps 62, 88 (colloquially referred to as "starving" the pumps) and potentially excessive aeration of the lubricant as larger volumes of air are mixed with the lubricant by actions of the pumps 62, 88; to a reduce performance of the control lubricant (e.g., oil) drawn from the sump 84 within the RA assembly housing 58 in controlling hydraulically-actuated components onboard the tractor 22.

To overcome the above-noted issues associated with lubricant stacking within the FA assembly 34, the controller 96 determines when to place the lubricant flow modification assembly 76 in a cold start mode; and, when so determining, commands the valve actuator 94 to move the shutoff valve 92 into a closed position. Closure of the shutoff valve 92 blocks or substantially prevents lubricant flow through the shutoff valve 92 and to the FA assembly 34; although a controlled, minimum lubricant flow may still be provided through the shutoff valve 92 or around the shutoff valve 92 in embodiments, as further discussed below in connection with FIGS. 7-10. As a result, little to no lubricant flow is permitted from the lubricant supply pump 62, through the flow divider section 74, and to the FA assembly 34 in the cold start mode to prevent, or at least greatly decrease, lubricant stacking within the FA assembly housing 56. Lubricant flow is still permitted from the lubricant supply pump 62, through the flow divider section 74, and to the RA assembly 38 in the cold start mode; however, to ensure adequate supply of lubricant to the sump 84 within the RA assembly housing 58 for control purposes and for return to the sump 66 maintained within the transmission housing 60. Concurrently, or shortly after the closure of shutoff valve 92, the valve(s) forming the lubricant warming mechanism 108 also modulate due to the pressure increase resulting from shutoff valve closure, with the modulation of the valve(s) resulting in a pressure increase at the output of the lubricant supply pump 62 to provide the desired lubricant warming function. Thus, both anti-stacking and rapid lubricant warming functions are achieved in an efficient, robust, and synchronized manner. When determining that the lubricant flow modification assembly 76 is appropriately returned to its default mode of operation (e.g., due to a lubricant temperature increasing to a level at which stacking is unlikely to occur), the controller 96 commands the valve actuator 94 to reopen the shutoff valve 92 and restore normal lubricant flow to the FA assembly 34. This also results in modulation of the valve(s) contained in the lubricant warming mechanism 108 in a manner returning pressure appearing at the output of the lubricant supply pump 62 to standard levels.

Figure 2:
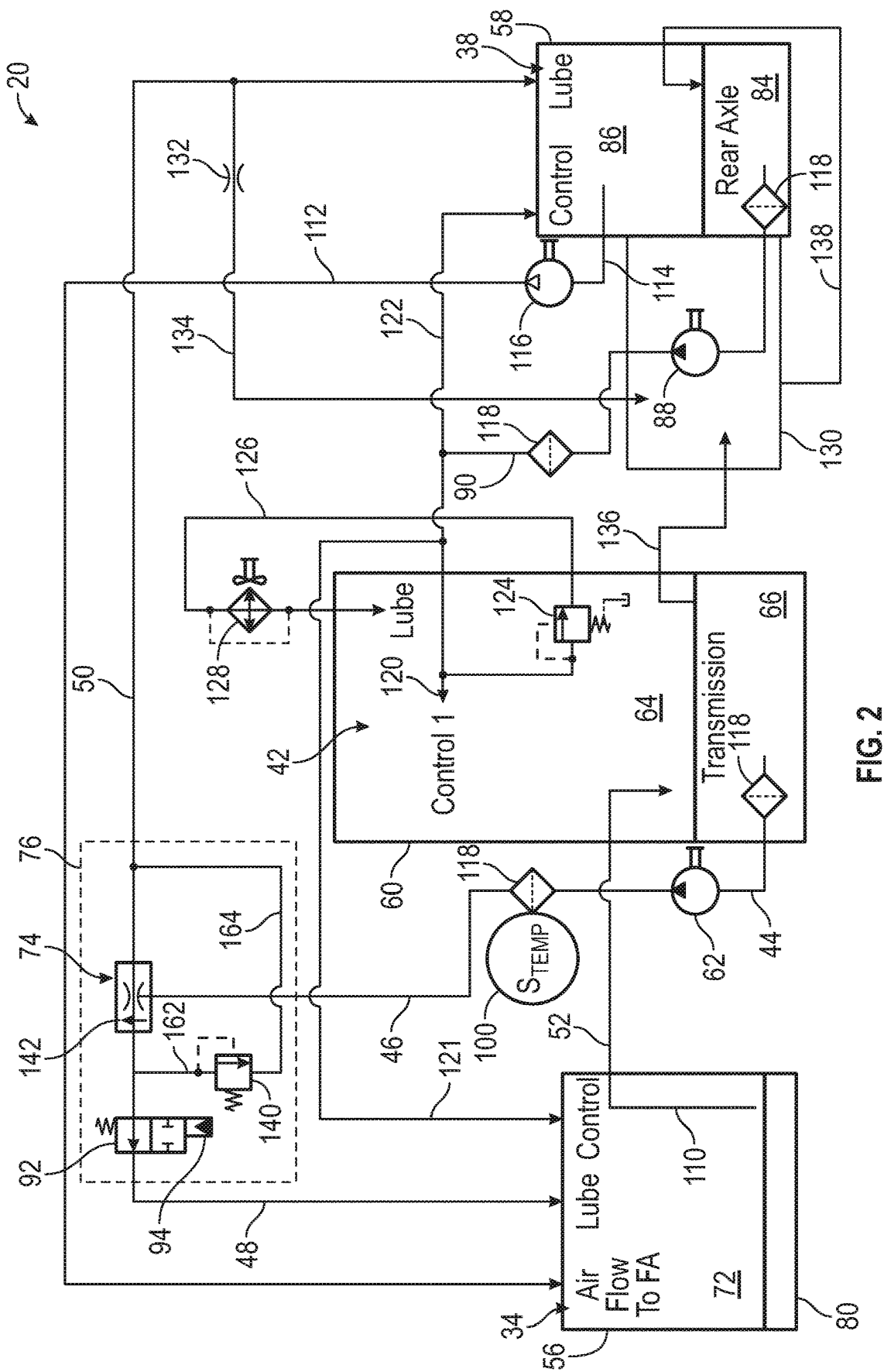
FIG. 2 is a flow schematic of the example cold start lubricant distribution system, an actively-lubricated front axle assembly, an actively-lubricated rear axle assembly, an actively-lubricated transmission, and other associated components included in the tractor shown in FIG. 1.

Advancing to FIG. 2, a flow schematic is presented illustrating one possible manner in which the cold start lubricant distribution system 20 may be implemented. Reference numerals are carried forward from FIG. 1, as appropriate. In addition to the various flow lines and components described above in connection with FIG. 1, it can be seen that the cold start lubricant distribution system 20 includes a number of additional components; and, further, that an example implementation of the lubricant flow modification assembly 76 is shown in greater detail. This example implementation of the lubricant flow modification assembly 76 is discussed more fully below in connection with FIGS. 3-6. First, however, the other components of the example cold start lubricant distribution system 20 will be discussed in greater detail to establish an example context in which embodiments of the lubricant flow modification assembly 76 may be better understood.

As previously noted, the air cavity 72 within the FA assembly housing 56 may be pressurized to urge lubricant outflow from the housing 56, through an outlet (e.g., standpipe 110), and to the flow line 52 to return the lubricant to the sump 66 within the transmission housing 60. To this end, an example airflow circuit 112, 114 for supplying pressurized airflow to the air cavity 72 of the FA assembly housing 56 is further shown in FIG. 2. A pneumatic pump 116 is positioned in the airflow circuit 112, 114, draws airflow from the air cavity 86 of the RA assembly housing 58, and delivers the pressurized airflow to the air cavity 72 of the FA assembly housing 56 via an airflow line 112. The action of the pump 116 may also reduce the internal pressure within the air cavity 86 of the RA assembly housing 58 to help draw lubricant flow into the FA assembly 38 through the flow line 50. In further implementations, a different source of pressurized airflow may be utilized to pressurize the air cavity 72 of the FA assembly housing 56, the air cavity 72 of the FA assembly housing 56 may not be pressurized, or an air cavity included in a different actively-lubricated assembly may be pressurized in a similar manner.

The example of the cold start lubricant distribution system 20 further includes various other components commonly included in lubricant distribution systems, such as a number of lubricant filters 118. Additionally, and as previously mentioned, some fraction of the lubricant (e.g., oil) within the sump 84 of the RA assembly 38 may be drawn-off by the control lubricant pump 88 and utilized for control purposes, as indicated in FIG. 2 by arrow 120. In this case, a fraction of the control lubrication may be directed through flow lines 121, 122 connected to inlets of the FA assembly housing 56 and the RA assembly housing 58, respectively. Additional, a pressure control valve 124 may be positioned in the control lubricant circuit; e.g., such that an inlet of the pressure control valve 124 is fluidly coupled to the flow line 90, while an outlet of the pressure control valve 124 is fluidly coupled to a lubricant cooling circuit 126 passing through a heat exchanger 128. The pressure control valve 124 may be biased toward a closed position and open when the pressure differential across the valve 124 surpasses a predetermined threshold to accommodate the volume expansion and provide additional lubricant cooling when appropriate due to, for example, heating of the circulated lubricant. Finally, in the example of FIG. 2, the control lubricant pump 88 is depicted as contained in a separate casing or housing 130, which receives a controlled lubricant flow directly through restricted orifice 132 and a flow line 134 branching from the flow line 50. Additionally, in certain cases, lubricant may flow from the sump 66 within the transmission housing 60, through a flow line 136, and into the interior of the pump housing 130. Some amount of lubricant may also be permitted to flow from the interior of the pump housing 130, through a return line 138, and to the sump 84 maintained in the RA assembly housing 58, as shown.

Figure 3:
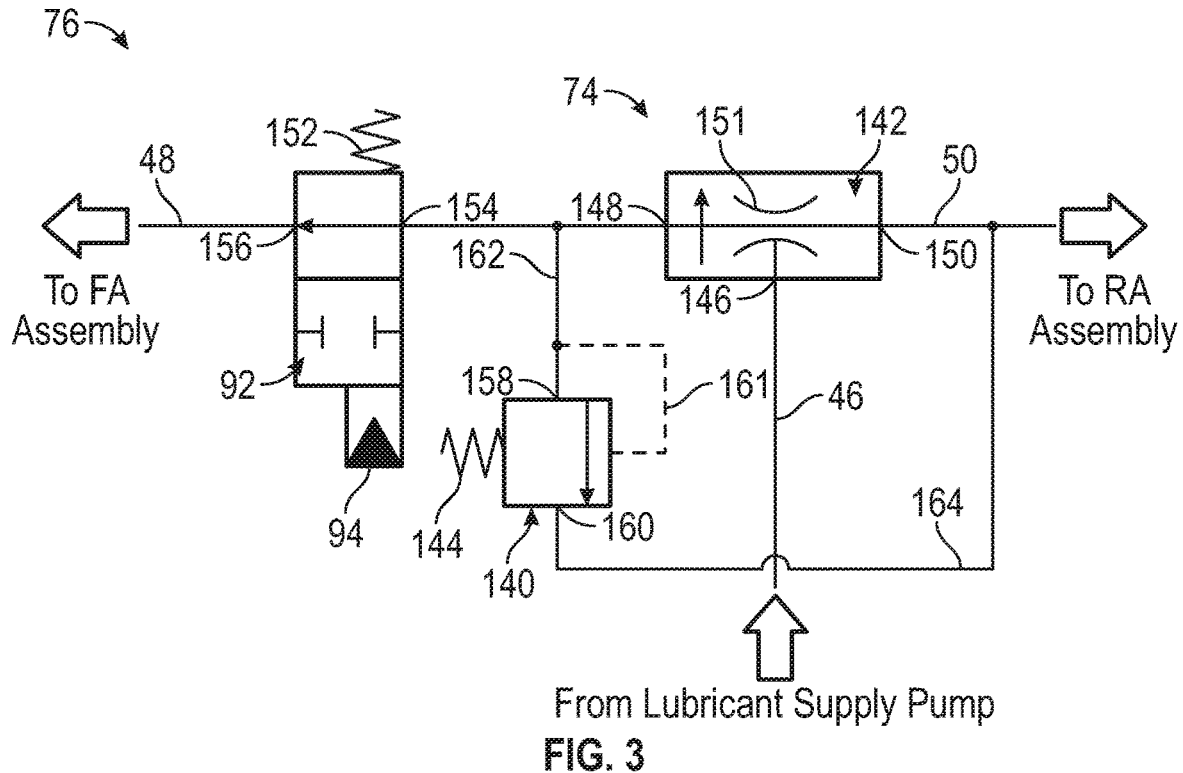
FIGS. 3 and 4 are detailed flow schematics of a lubricant flow modification assembly suitably included in the cold start lubricant distribution system, as shown in default and cold start modes of operation, respectively.
Figure 4:
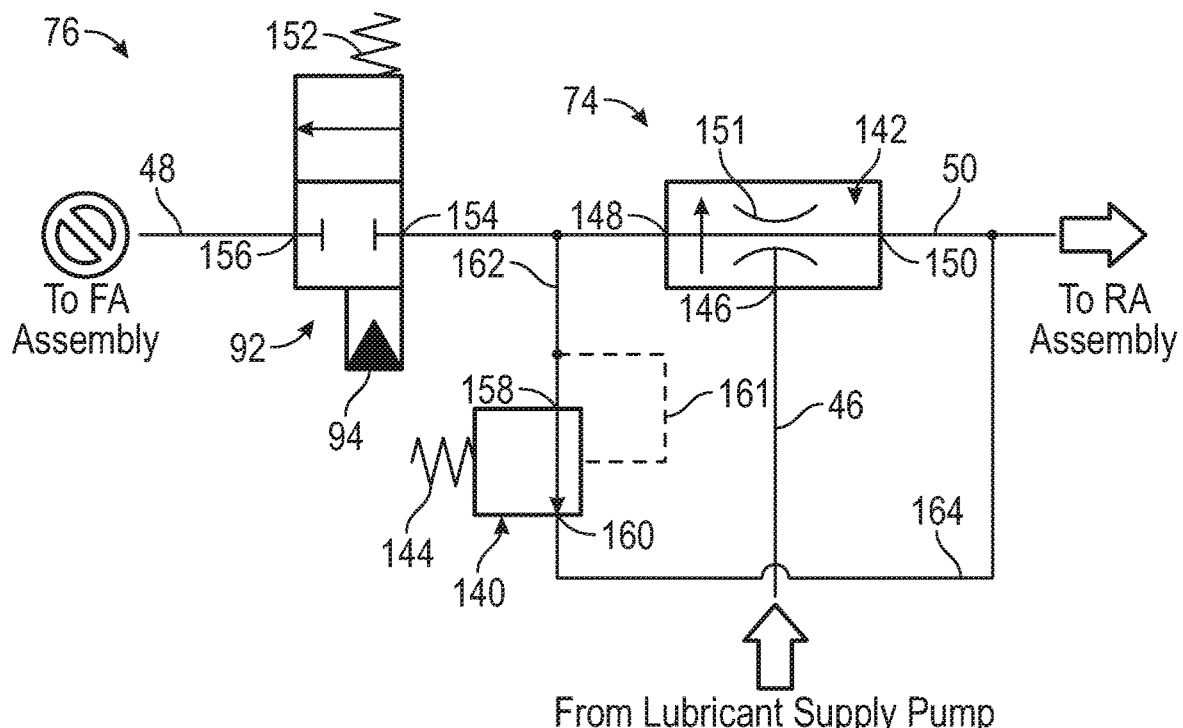

The example implementation of the lubricant flow modification assembly 76 shown in FIG. 2 will now be discussed in conjunction with FIGS. 3 and 4. Referring collectively to FIGS. 2-4, the shutoff valve 92 assumes the form of a spring-based, 2-way shutoff valve in the illustrated example, while the valve actuator 94 assumes the form of a solenoid (and will thus be referred to as the "solenoid 94" hereafter). Two additional valves are included in the lubricant flow modification assembly 76 in this example: (i) a pressure relief valve 140, and (ii) a variable flow control valve 142. Jointly, the valves 140, 142 may be considered to constitute the lubricant warming mechanism 108 schematically shown in FIG. 1. Additionally, in this embodiment, the variable flow control valve 142 assumes the form of a 3-way pressure balance valve and will consequently be referred to as the "pressure balance valve 142" following this paragraph. In further embodiments, the variable flow control valve 142 can be implemented utilizing a different type of valve, which is controllable to increase the flow resistance from the flow line 46, through the variable flow control valve 142, and to the flow line 50, thereby increasing the pressure at the outlet of lubricant supply pump 62 in the manner described herein. As a further possibility, the variable flow control valve 142 (and the pressure relief valve 140) may be omitted from the lubricant flow modification assembly 76 in embodiments in which the accelerated lubricant warming function is not desired.

The pressure balance valve 142 includes an inlet 146 connected to the flow line 46 (the lubricant supply line), a first outlet 148 connected to the flow line 48 leading to the FA assembly housing 56, and a second outlet 150 connected to the flow line 50 leading to the RA assembly housing 58. As indicated by symbology 151, the pressure balance valve 142 contains a movable valve element, such as a translating spool, which adjusts its position in response to the pressure differential across the outlets 148, 150. Specifically, the spool (or other valve element) of the pressure balance valve 142 modulates such that, as the pressure appearing at the outlet 148 increases relative to the pressure appearing at the outlet 150, the spool shifts position to (i) enlarge the cross-sectional flow area through the valve 142 from the inlet 146 to the outlet 148 (decreased flow resistance), while (ii) restricting the cross-sectional flow area through the valve 142 from the inlet 146 to the outlet 150 (increased flow resistance). Conversely, as the pressure at the outlet 148 decreases relative to the pressure at the outlet 150, the spool shifts position to (i) reduces the cross-sectional flow area through the valve 142 from the inlet 146 to the outlet 148 (increased flow resistance), while (ii) enlarging the cross-sectional flow area through the valve 142 from the inlet 146 to the outlet 150 (decreased flow resistance). Accordingly, the spool of the pressure balance valve 142 continually seeks a balanced or pressure-equalized position at which the respective pressures appearing at the outlets 148, 150 are substantially equivalent. Typically, although non-essentially, the pressure balance valve will be configured such that, when the pressures appearing at the outlets 148, 150 are equivalent, the spool resides in an intermediate position, and the lubricant flow received at inlet 146 will be split or divided equally between the outlets 148, 150.

The shutoff valve 92 includes an inlet 154, which is fluidly coupled to the outlet 148 of the pressure balance valve 142; and an outlet 156, which is fluidly coupled to an inlet of the FA assembly housing 56 via the remainder of the flow line 48. As noted above, the shutoff valve 92 is movable between an open position (FIG. 3) and a closed position (FIG. 4). The shutoff valve 92 is biased toward the open position (FIG. 3) by a spring 152. Energization of the solenoid 94 exerts sufficient force on the valve element of the shutoff valve 92 to overcome this bias force, compress (or otherwise deflect) the spring 152, and mover the shutoff valve 92 into the closed position (FIG. 4). The shutoff valve 92 is thus biased toward the open position in which lubricant flow is permitted from the lubricant supply pump 62, through the flow divider section 74 (including the pressure balance valve 142), through the flow line 48 (including through the shutoff valve 92), and to the FA assembly 34. The shutoff valve 92 will thus fail safe should the solenoid 94 fail to operate properly. When determining that the lubricant flow modification assembly 76 is appropriately placed in the cold start mode, the controller 96 energizes the solenoid 94, which then moves the shutoff valve 92 into the closed position as shown in FIG. 4.

As does the shutoff valve 92, the bypass valve 140 includes an inlet 158, an outlet 160, and a spring 144 (or similar biasing element) urging movement of the shutoff valve 92 toward a closed position (FIG. 3). The inlet 158 of the bypass valve 140 is fluidly coupled between the outlet 148 of the pressure balance valve 142 and the inlet 154 of the shutoff valve 92 via a flow line 161. The outlet 160 of the bypass valve 140 can be fluidly coupled to various different components or regions of the cold start lubricant distribution system 20, such as one or more of the FA assembly 34, the RA assembly 38, and the transmission 42, as further discussed below in connection with FIGS. 7-10. In the present example, the outlet 160 of the bypass valve 140 is fluidly coupled to the flow line 50, and therefore to the RA assembly housing 58, via a flow line 164. Jointly, the flow lines 162, 164 form a bypass channel 162, 164. A pressure sense line 161 applies the pressure appearing at the inlet 158 of the bypass valve 140 to an active area of the valve element within the bypass valve 140 urging movement of the valve element in a direction opposite the spring 144. Thus, when the pressure appearing at the inlet 158 surpasses a set value, the pressure bypass valve 140 opens, and lubricant is able to flow from the outlet 148 of the pressure balance valve 142, through the bypass channel 162, 164, and to the flow line 50 leading the RA assembly 38.

In the default mode (FIG. 3), the shutoff valve 92 resides in the open position due to the spring bias force, while the pressure bypass valve 140 resides in its closed position. Lubricant discharged from the lubricant supply pump 62 thus flows through the flow line 46 and into the pressure balance valve 142. The respective pressures appearing at the outlets 148, 150 of the pressure balance valve 142 are substantially equivalent in this instance (noting, again, that the shutoff valve 92 resides in an open position). Consequently, the spool of the pressure balance valve 142 resides in an intermediate or neutral position, and pressure balance valve 142 apportions the lubricant flow from the flow line 46 equally (or in another set ratio) between the outlets 148, 150. When determining that the lubricant flow modification assembly 76 should be placed in the cold start mode of operation, as shown in FIG. 4, the controller 96 (FIG. 1) energizes the solenoid 94 (considered a "command" herein) causing the shutoff valve 92 to move into a closed position. Now closed, the shutoff valve 92 blocks lubricant flow to the FA assembly 34 to prevent lubricant stacking therein. Concurrently, the pressure within the flow line 161 increases, which causes the spool of the pressure balance valve 142 to seek a position to equalize the pressures appearing at outlet 148 with the pressure appearing at 150. The flow resistance across the pressure balance valve 142 from the inlet 146 to the outlet 150 (and therefore the flow resistance from the lubricant supply pump 62 to the RA assembly 38) thus increases. This, in turn, gradually increases the pressure appearing at the outlet of the lubricant supply pump 62 to provide the desired lubricant warming function.

The pressure accumulation within the flow line 161, and the continued spool movement of the pressure balance valve 142 to increase the flow restriction from the inlet 146 to the outlet 150, continues for a brief period of time until the predetermined pressure (the cracking pressure) of the bypass valve 140 is surpassed within the flow line 161 and, therefore, within the upstream sense line 161. This causes the bypass valve 140 to move into an open position allowing the pressurized lubricant to flow from the outlet 148 of the pressure balance valve 142; through the bypass line 161, 164; and, in the present example, enter the flow line 50 leading to the RA assembly 38. Thus, by setting the cracking pressure of the bypass valve 140, the flow rate of lubricant from the lubricant supply pump 62 and to the RA assembly 38 can be selected by design. Additionally, the rate of lubricant warming in the cold start mode may be accelerated or decelerated, by design or by post-manufacture fine-tuning, through adjustments in the pressure at which the bypass valve 140 initially opens or cracks. Generally, as the cracking pressure of the bypass valve 140 increases, so too does the rate of lubricant warming when the lubricant flow modification assembly 76 operates in the cold start mode. Conversely, a lesser rate of lubricant warming occurs in embodiments in which the cracking pressure of the bypass valve 140 is lower. Finally, in implementations in which rapid lubricant warming is of lesser importance (as compared to the anti-stacking function of cold start lubricant distribution system 20), the cracking pressure of the bypass valve 140 may be set to a relatively lower threshold; or, perhaps, the bypass valve 140 (and the associated flow lines) may be eliminated from the cold start lubricant distribution system 20 altogether.

As previously stated, the controller 96 of the cold start lubricant distribution system 20 may determine that the lubricant flow modification assembly 76 is appropriately placed in the cold start mode based, at least in part, on lubricant temperature as indicated by a lubricant temperature sensor 100; e.g., as indicated in FIG. 2, the lubricant temperature sensor 100 may be placed downstream of the lubricant supply pump 62 and, perhaps, conveniently mounted to the header of a filter assembly. Additionally, the controller 96 may consider other inputs in determining when to place the lubricant flow modification assembly 76 in the cold start mode, such as a detected rotational rate of the front axle 32 or the rear axle 36. When subsequently determining that the lubricant flow modification assembly 76 should return to its default or standard mode of operation, the controller 96 need only deenergize the solenoid 94 to allow the shutoff valve 92 to return the open position. This causes the pressure within the flow line 161 to rapidly drop, the bypass valve 140 to return to a closed position, and the pressure balance valve 142 to return to an intermediate or neutral spool position, once again dividing lubricant flow received via the lubricant supply pump 62 substantially equivalently between the FA assembly 34 and the RA assembly 38 via the flow lines 48, 50, respectively.

In the interest of providing a comprehensive disclosure, and by way of non-limiting example only, an example structural implementation of the lubricant flow modification assembly 76 shown in FIGS. 3 and 4 will now be described in connection with FIGS. 5 and 6. Once again, reference numerals are carried forward where appropriate. In the example structure implementation presented in FIGS. 5 and 6, the lubricant flow modification assembly 76 includes a main casing or housing 166 (shown in cutaway or cross-section), which may be assembled from any number of components; e.g., the main housing 166 may be assembled from two (e.g., cast) halves, which are bolted or otherwise joined together. The main housing 166 contains various compartments or chambers 168, 170, 172, 174, 176, 178, 180 through which lubricant may flow, as described below.

Figure 5:
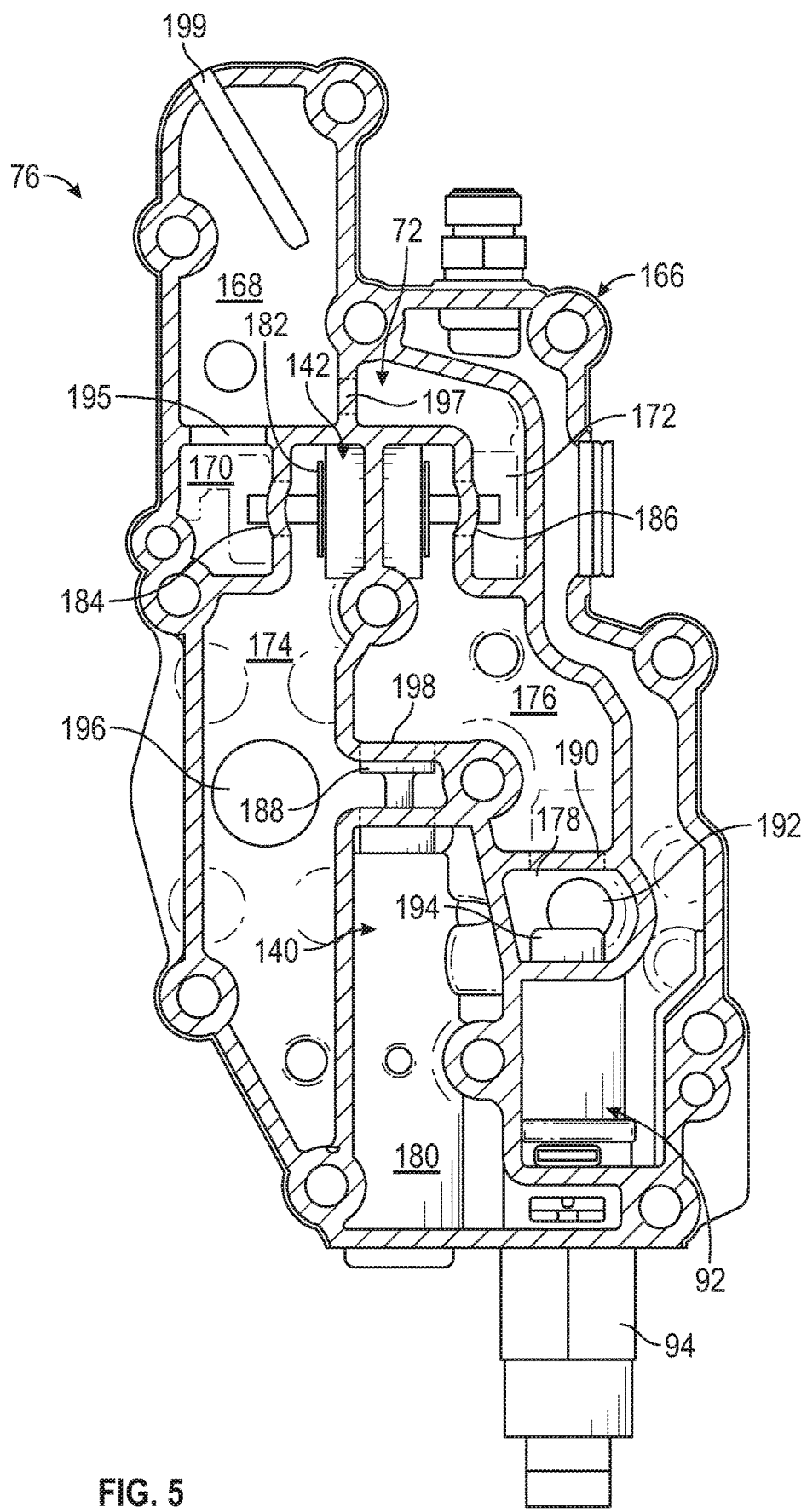
FIGS. 5 and 6 are cutaway views of a flow modification module in default and cold start modes of operation, respectively, illustrating one possible manner in which the lubricant flow modification assembly shown in FIGS. 3 and 4 may be structurally implemented.

Referring initially to FIG. 5, the lubricant flow modification assembly 76 is shown in the default mode of operation. Thus, the spool 182 of the pressure balance valve 142 resides in an intermediate position such that the cross-sectional of the variable orifices 184, 186 of the pressure balance valve 142 is substantially equivalent. Further, the bypass valve 140 is in a closed position, as indicated by the extended state of a plunger valve element 188 included in the bypass valve 140. Concurrently, the shutoff valve 92 is in an open position permitting flow from a port 190 provided in an internal wall of the main housing 166 to an outlet 192 of the main housing 166 fluidly connected to the FA assembly 34. Specifically, the plunger 194 of the shutoff valve 92 remains in a retracted state presently, but may be extended to block lubricant flow through the port 190 as further discussed below. In addition to outlet 192, the main housing 166 further includes an outlet 196, which is fluidly coupled to the RA assembly 38 when the lubricant flow modification assembly 76 is installed onboard the tractor 22 (FIG. 1); and an inlet 199, which is fluidly coupled to an outlet of the lubricant supply pump 62.

As discharged by the lubricant supply pump 62, lubricant flow enters the chamber 168 of the main housing 166 via the inlet 199. From the inlet chamber 168, the lubricant is partitioned between the chambers 170, 172 within the main housing 166, which effectively serve as the inlets or "pre-chambers" of the pressure balance valve 142. The pressure within each chamber 170, 172 acts in opposition on the effective area of the spool 182 to translate the spool 182 into a pressure balance position in the manner previously described. For example, as the pressure within the chamber 170 increases the spool 182 will slide to the right to enlarge the cross-sectional flow area through the variable orifice 184, while concurrently reducing the cross-sectional flow area through the variable orifice 186. In the example shown in FIG. 5, the spool 182 is in a neutral position such that the cross-sectional flow areas through the variable orifices 184, 186 are substantially equivalent. Lubricant is thus permitted to flow from the chamber 170, through the orifice 184, into the chamber 174, and ultimately exit the main housing 166 of the lubricant flow modification assembly 76 through outlet 196 leading to the RA assembly 38. Similarly, at a substantially equivalent flow rate, lubricant is permitted to flow from the chamber 172, through the orifice 186, into the chamber 176, into the chamber 178, and exit the main housing 166 through the outlet 192 leading to the FA assembly 34.

When flowing from the inlet chamber 168 into the pre-chambers 170, 172, the lubricant passes through two specifically-sized orifices 195, 197 formed as cutouts or as other features (e.g., cast-in openings) within the corresponding internal walls of the main housing 166. The relative sizing of the orifices 195, 197 is at least partially, if not largely determinative of the manner in which lubricant flow is apportioned between the actively-lubricated work vehicle assemblies through which the lubricant circulates. Considering this, the orifices 195, 197, and the surrounding infrastructure, are essentially analogous to the flow divider section 74 of the lubricant flow modification assembly 76 described above in connection with FIGS. 1-4. In the illustrated example, specifically, the relative sizing of the orifices 195, 197 is largely determinative of the lubricant flow apportionment between the FA assembly 34 and the RF assembly 38 under normal (standard) operating conditions of the cold start lubricant distribution system 20. The size (cross-sectional flow area) of the orifice 195 may be enlarged relative to the size of the orifice 197 in embodiments in which it is desired to apportion a greater fraction of lubricant flow to the RA assembly 38 relative to the FA assembly 34. Conversely, the size of the orifice 197 may be enlarged relative to the size of the orifice 195 in instances in which a greater fraction of lubricant flow is desirably apportioned to the FA assembly 34. Further, in instances in which it is desired to provide an essentially equivalent or "50/50" split of the lubricant flow to the FA assembly 34 and the RA assembly 38 under normal operating conditions, the orifices 195, 197 may be equally sized; or, perhaps, the pre-chambers 170, 172 and the orifices 195, 197 may be eliminated from the main housing 166 of the lubricant flow modification assembly 76 in their entirety.

When determining that the lubricant flow modification assembly 76 is appropriately placed in the cold start mode of operation, the controller 96 commands the solenoid 94 to move the shutoff valve 92 into a closed or blocking position. This causes the extension of the plunger 194 of the shutoff valve 92, thereby blocking lubricant flow from the chamber 176, through the port 190, and to the chamber 178. The sequence of events described above in connection with FIG. 4 ensues. In particular, the pressure within the chamber 176 accumulates, thereby causing the spool 182 of the pressure balance valve 142 to shift to the left in the illustrated orientation. The cross-sectional flow area across the variable orifice 186 increase, while the cross-sectional flow area across the opposing variable orifice 184 decreases to increase the flow resistance from the lubricant supply pump 62, through the main housing 166 of the lubricant flow modification assembly 76, and to the RA assembly 38. As the pressure within the chamber 176 continues to climb, the force exerted on the exposed face of the plunger 188 of the bypass valve 140 becomes sufficient to open the bypass valve 140, here by causing the plunger 188 to retract as shown in FIG. 6. Lubricant flow from the chamber 176, through an orifice or port 198 provided through an internal wall of the main housing 166, and into the chamber 174 is thus no longer blocked by the plunger 188 of the bypass valve 140. Consequently, lubricant flow is routed from the outlet of the pressure balance valve 142 corresponding to the variable orifice 186, through the port 198 (corresponding to the outlet of the bypass valve 140), and to the outlet 196 leading to the RA assembly 38. This is analogous to routing of lubricant through the bypass channel 162, 164 and to the flow line 50 in the schematic of FIG. 4, as previously discussed.

Additional Examples of the Cold Start Lubrication Systems Having Alternative Flow Routing Schemes There has thus been provided embodiments of a work vehicle lubricant distribution system operable in a unique cold start mode. When operating in the cold start mode, the lubricant distribution system reduces or eliminates issues related to lubricant stacking, as well as accelerating lubricant warming to hasten return of the cold start lubricant distribution system to a standard or default mode of operation. In the example shown in FIGS. 1-6, the cold start lubricant distribution system fully prevents lubricant flow to a stacking-prone work vehicle assembly (namely, the FA assembly 34 shown in FIGS. 1 and 2). In further implementations, it may be desirable to provide a controlled minimum flow to the FA assembly 34 (or other stacking-prone work vehicle assembly) in the cold start mode to provide some degree of lubrication to the rotating components of the FA assembly 34 under cold start conditions. This can easily be accomplished, when so desired, by providing a controlled leakage through the shutoff valve 92; e.g., by forming one or more flow channels having a relatively small, restricted orifice through the valve element of the shutoff valve 92. For example, in the case of the plunger 194 shown in FIGS. 5 and 6, an axial channel may be bored or otherwise formed in the plunger 194, with one or more cross-bores further connecting to the axial channel to form a restricted flow passage permitting a minimal degree of lubricant (e.g., oil) flow from the chamber 176, through the plunger 194, and to the chamber 178 when the plunger 194 is moved into the extended blocking position shown in FIG. 6.

Figure 8:
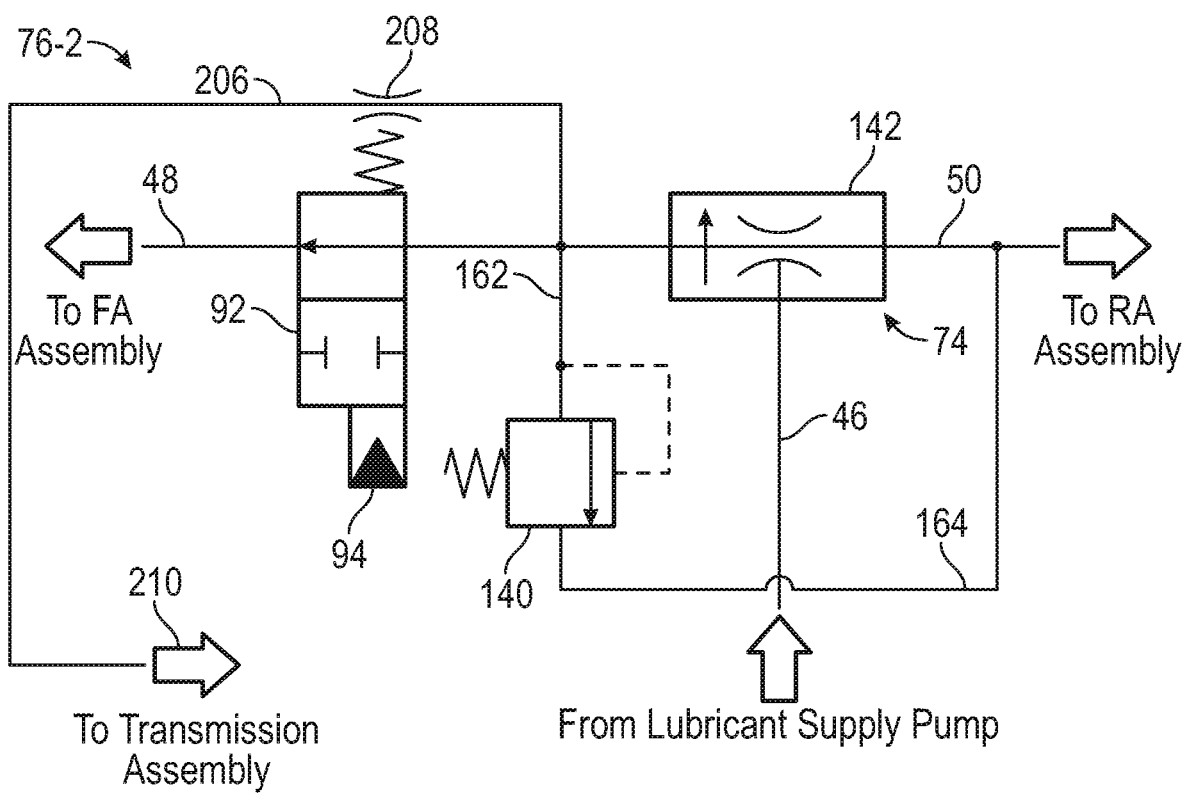
Figure 9:
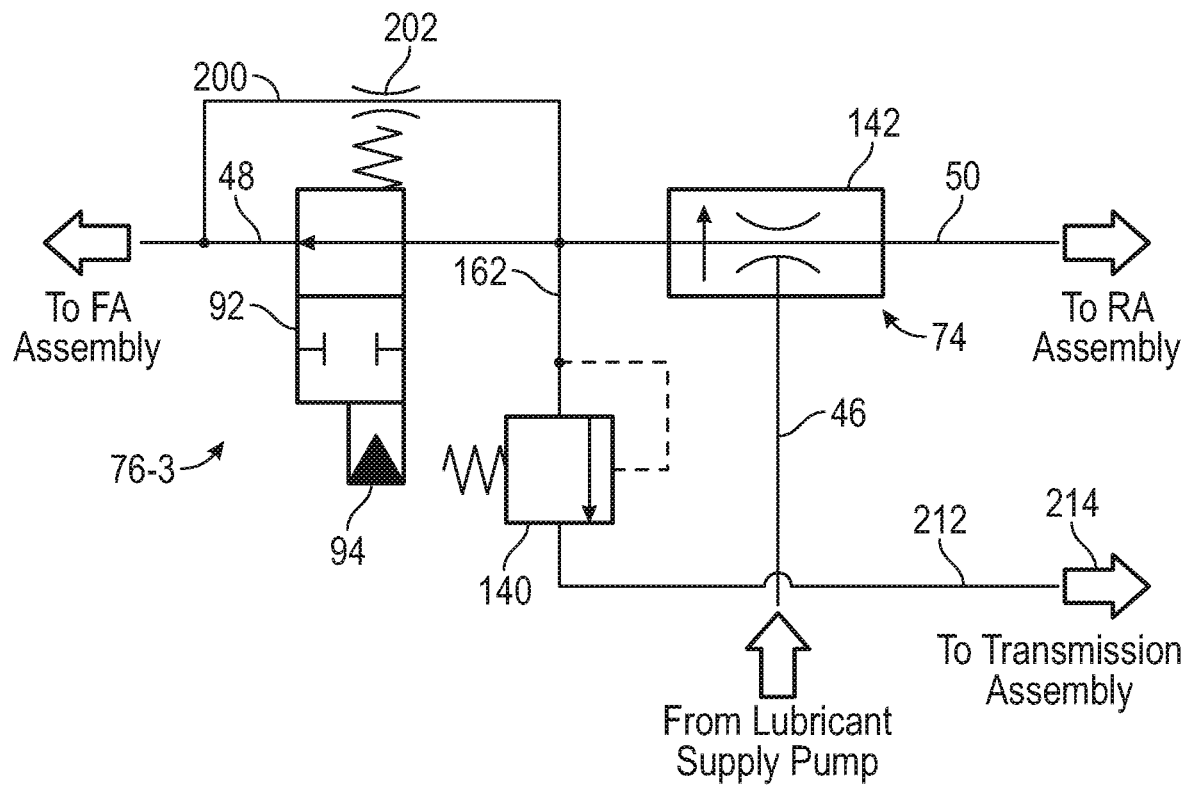
Figure 10:
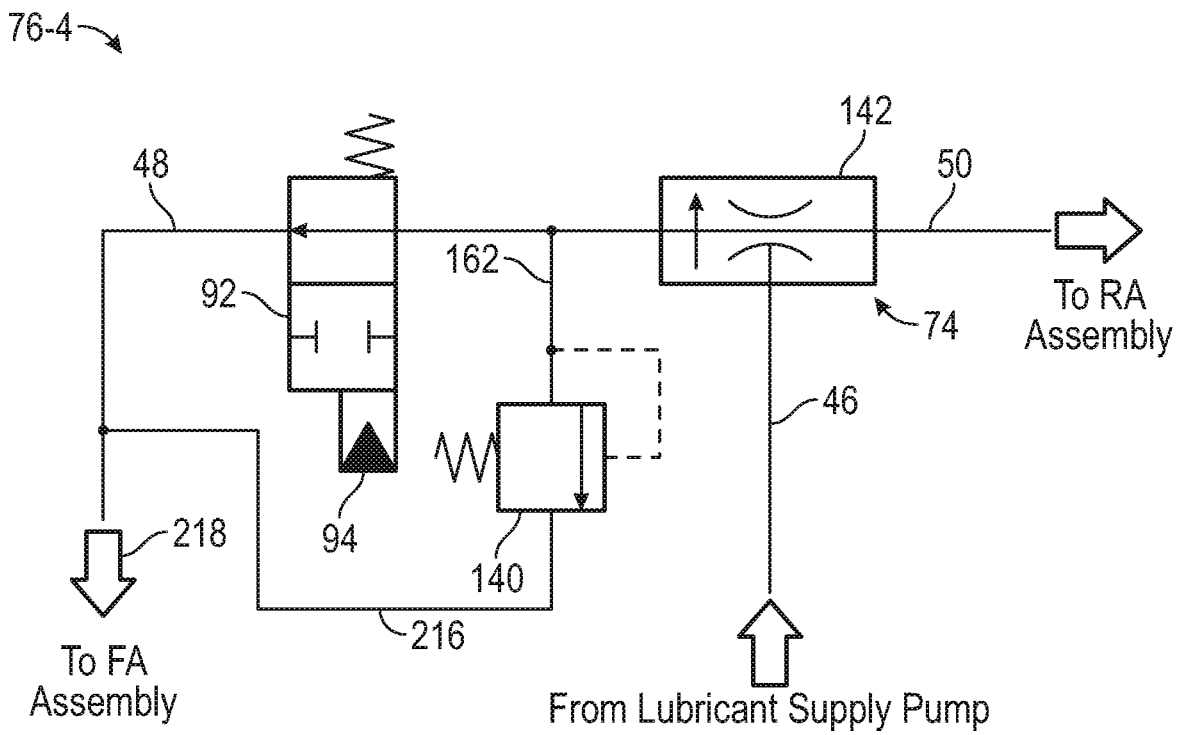

Additionally or alternatively, in embodiments in which it is desired to provide a controlled minimum lubricant flow to the FA assembly 34 when the shutoff valve 92 is in the closed position, a bypass channel may be provided enabling lubricant discharged from the outlet 148 of the pressure balance valve 142 to flow around the shutoff valve 92 and to the FA assembly 34. A further example embodiment of a lubricant flow modification assembly 76-1 suitable for inclusion in the cold start lubricant distribution system 20 and having such a shutoff valve bypass channel 200 is schematically shown in FIG. 7. As appended to identified "76-1," the "-1" indicates that the illustrated lubricant flow modification assembly 76-1 is a first variant of the lubricant flow modification assembly 76 discussed above in connection with FIGS. 2-6. This numbering convention is continued when describing lubricant flow modification assemblies 76-2, 76-3, and 76-4, as schematically shown in FIGS. 8, 9, and 10, respectively, and further discussed below. As can be seen in FIG. 7, a bypass channel 200 is provided to route lubricant flow around the shutoff valve 92 when in a closed position, with a restricted orifice 202 provided in bypass channel 200. Due to the sizing of bypass channel 200 and particularly restricted orifice 202, only a minimum flow of lubricant (commonly referred to as a "controlled leakage") is permitted to flow from the corresponding outlet of the pressure balance valve 142, around the shutoff vale 92, and to the FA assembly 34. This ensures that FA assembly 34 receives a continued, albeit supply of active lubrication flow under cold start conditions, while restricting the lubricant flow to a degree sufficient to prevent, or at least minimize, lubricant build-up or stacking within the FA assembly housing 56 (FIG. 1). Further, as the viscosity of the lubricant decreases in conjunction with gradual warming of the lubricant following initial start-up under cold start conditions, the lubricant flow through the bypass channel 200 and the restricted orifice 202 will likely gradually increase. The rate of lubricant flow to the FA assembly 34 is thus gradually increased as the lubricant temperature increases and lubricant stacking within the FA assembly housing 56 progressively becomes less problematic.

Figure 6:
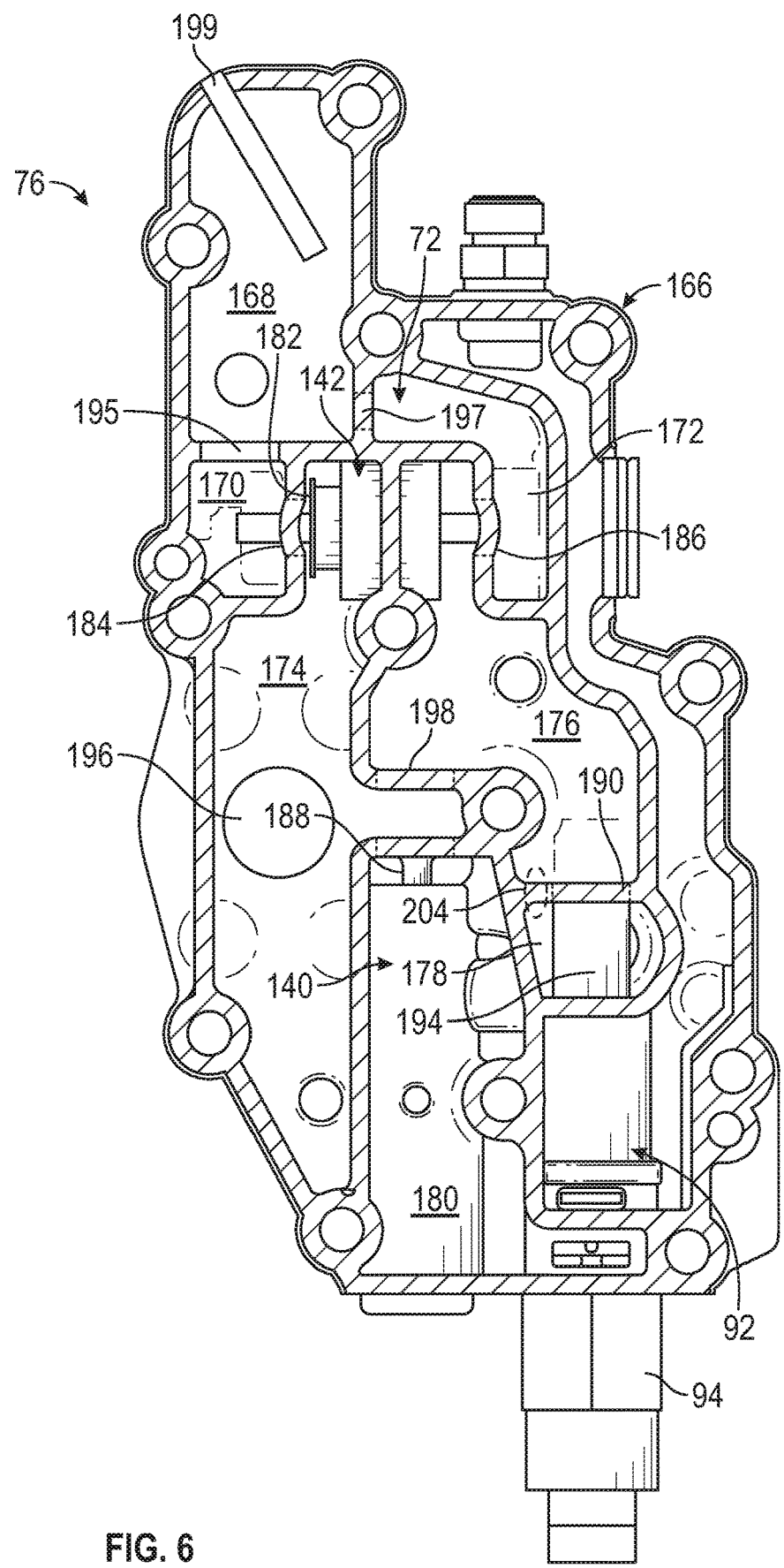
Figure 7:
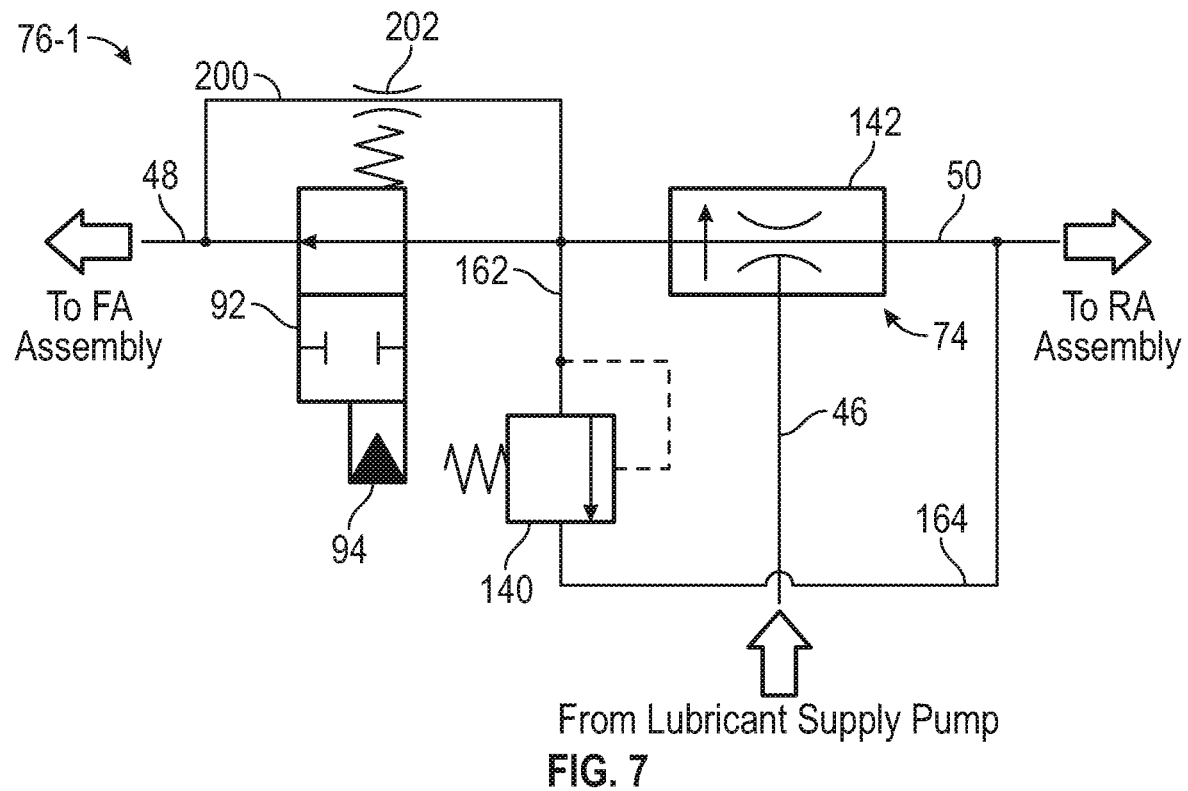
FIGS. 7-10 are flow schematics illustrating lubricant flow modification assemblies suitable for usage in alternative embodiments of the cold start lubricant distribution system and having various example flow distribution configurations.

Briefly comparing FIG. 7 to FIGS. 5 and 6, the lubricant routing scheme schematically shown in FIG. 7 can readily be provided by modifying the main housing 166 to include a restricted flow passage or small orifice through the internal wall of the housing 166 at a location adjacent the through-wall port 190, such as the location indicated in FIG. 6 by a circle 204. Thus, when the plunger 194 of the illustrated shutoff valve 92 is in the closed or blocking position, as illustrated, a minimal volume of lubricant flow will still be permitted to flow from the chamber 176, through such a bypass orifice, into the chamber 178, and through the outlet 192 leading the FA assembly 34. In further embodiments, one or more shutoff valve bypass channels may be configured to route lubricant flow to other actively-lubricated work vehicle assemblies when the shutoff valve 92 is closed. Consider, for example, the lubricant flow modification assembly 76-2 shown in FIG. 8. In this example variant, a bypass channel 206, including a restricted orifice 208, is again provided to permit a controlled, minimum lubricant flow around the shutoff valve 92 when in the closed position. However, in this case, the controlled lubricant flow is directed to the transmission 42, as indicated in FIG. 8 by an arrow 210.

In still further embodiments, lubricant flowing through the bypass valve 140 may be routed to an actively-lubricated work vehicle assembly or assembly combination in addition to or in lieu of the RA assembly 38. For example, and carrying forward reference numerals where appropriate, a lubricant flow modification assembly 76-3 shown in FIG. 9 includes a flow line 212 fluidly coupled to the outlet of the bypass valve 140 in a manner similar to the lubricant flow modification assembly 76 shown in FIGS. 2-6. However, in contrast to the lubricant flow modification assembly 76, which directed bypass flow to the RA assembly 38, the flow line 212 of the lubricant flow modification assembly 76-3 routes the bypass lubricant flow to the transmission 42, as indicated by an arrow 214. Such a configuration may be useful when it is desired to ensure a larger volume of lubricant flow to the transmission 42 under cold start conditions. Additionally, the shutoff valve bypass channel 200 is provided in the example of FIG. 9 such that a controlled, minimum lubricant flow is still permitted to the FA assembly 34 under cold start conditions. As a still further possibility, and as indicated in FIG. 10, a variation of the lubricant flow modification assembly 76-4 may include a flow line 216 connecting the outlet of the bypass valve 140 to the flow line 48 leading to the FA assembly 34. Bypass lubricant flow is thus permitted around the shutoff valve 92 when in the closed position, through the bypass valve 140, through the bypass channel 162, 216, into the flow line 48, and ultimately to the FA assembly 34 (indicated in FIG. 10 by an arrow 218) after sufficient pressure accumulation on the inlet side of the bypass valve 140. In this case, the bypass valve 140 may be sized, or a restricted orifice may be placed in the flow line 216, to provide a decreased rate of lubricant flow to the FA assembly 34 relative to the lubricant flow rate thereto when the shutoff valve 92 is open.

Enumerated Examples of the Cold Start Lubricant Distribution System

The following examples of the cold start lubricant distribution system are further provided and numbered for ease of reference.

1. Embodiments of the cold start lubricant distribution system are utilized onboard a work vehicle having first and second actively-lubricated work vehicle assemblies. In certain embodiments, the cold start lubricant distribution system includes a lubricant distribution circuit fluidly interconnecting the first and second actively-lubricated work vehicle assemblies, a flow divider section included in the lubricant distribution circuit and through which lubricant flow is apportioned between the first and second actively-lubricated work vehicle assemblies, and a lubricant supply pump located in the lubricant distribution circuit. When active, the lubricant supply pump urges lubricant flow through the flow divider section. The cold start lubricant distribution system further includes a lubricant flow modification assembly, which is operable in a cold start mode. When operating in the cold start mode, the lubricant flow modification assembly reduces a volume of lubricant flow supplied to the first actively-lubricated work vehicle assembly through the flow divider section relative to a volume of lubricant flow supplied to the second actively-lubricated work vehicle assembly through the flow divider section.

2. The cold start lubricant distribution system of example 1, wherein, when operating in the cold start mode, the lubricant flow modification assembly increases a resistance to lubricant flow from the lubricant supply pump to the second actively-lubricated assembly to accelerate lubricant warming.

3. The cold start lubricant distribution system of example 1, wherein the first and second actively-lubricated work vehicle assembly include first and second axle assemblies, respectively.

4. The cold start lubricant distribution system of example 3, wherein the work vehicle further includes a work vehicle transmission through which at least one of the first and second axle assemblies is driven. The lubricant distribution circuit fluidly interconnects the work vehicle transmission, the first axle assembly, and the second axle assembly.

5. The cold start lubricant distribution system of example 1, wherein the lubricant flow modification assembly includes a shutoff valve movable between a closed position and an open position. When in the closed position, the shutoff valve prevents or substantially prevents lubricant flow from the lubricant supply pump, through the flow divider section, and to the first actively-lubricated work vehicle assembly.

6. The cold start lubricant distribution system of example 5, further including a pressure relief valve positioned in the lubricant distribution circuit upstream of the shutoff valve. Included in the lubricant distribution circuit, a flow line fluidly connects an outlet of the pressure relief valve to an inlet of the first actively-lubricated work vehicle assembly.

7. The cold start lubricant distribution system of example 5, further including a pressure relief valve positioned in the lubricant distribution circuit upstream of the shutoff valve. Included in the lubricant distribution circuit, a flow line fluidly couples an outlet of the pressure relief valve to an inlet of the second actively-lubricated work vehicle assembly.

8. The cold start lubricant distribution system of example 5, wherein the work vehicle further includes a work vehicle transmission fluidly interconnected with the first and second actively-lubricated work vehicle assemblies through the lubricant distribution circuit. The cold start lubricant distribution system further includes a pressure relief valve and a flow line. The pressure relief valve is positioned in the lubricant distribution circuit upstream of the shutoff valve. The flow line is included in the lubricant distribution circuit and fluidly couples an outlet of the pressure relief valve to an inlet of the work vehicle transmission.

9. The cold start lubricant distribution system of example 5, wherein the lubricant flow modification assembly further includes a valve actuator controllable to move the shutoff valve from the open position to the closed position. A controller is coupled to the valve actuator and is configured to: (i) selectively place the lubricant flow modification assembly in the cold start mode, and (ii) command the valve actuator to move the shutoff valve into the closed position when placing the lubricant flow modification assembly in the cold start mode.

10. The cold start lubricant distribution system of example 9, further including a lubricant temperature sensor configured to monitor a current lubricant temperature. The controller is coupled to the lubricant temperature sensor and is configured to selectively place the lubricant flow modification assembly in the cold start mode based, at least in part, on the current lubricant temperature.

11. The cold start lubricant distribution system of example 9, wherein the first actively-lubricated work vehicle assembly includes a work vehicle axle. The cold start lubricant distribution system further includes a sensor providing data indicative of a current rotational rate of the work vehicle axle. The controller is coupled to the sensor and is configured to selectively place the lubricant flow modification assembly in the cold start mode based, at least in part, on the current rotational rate of the work vehicle axle.

12. The cold start lubricant distribution system of example 5, wherein the lubricant flow modification assembly further includes a thermostatic actuator coupled to the shutoff valve and configured to move the shutoff valve from the open position to the closed position when a lubricant temperature falls below a minimum threshold value.

13. The cold start lubricant distribution system of example 5, wherein a restricted minimum lubricant flow is permitted from the lubricant supply pump to the first actively-lubricated work vehicle assembly when the shutoff valve is in the closed position.

14. The cold start lubricant distribution system of example 5, wherein the lubricant flow modification assembly further includes a variable flow control valve having an inlet coupled to the lubricant supply pump, a first outlet fluidly coupled to an inlet of the first actively-lubricated work vehicle assembly through the shutoff valve, and a second outlet fluidly coupled to an inlet of the second actively-lubricated work vehicle assembly.

15. The cold start lubricant distribution system of example 14, wherein the variable flow control valve includes a pressure balance valve to adjust a fraction of lubricant flow apportioned between the first and second outlets of the pressure balance valve in response a pressure differential across the first and second outlets of the pressure balance valve.

CONCLUSION

The foregoing has thus provided embodiments of a work vehicle lubricant distribution system operable in a unique cold start mode, which enhances lubricant flow under cold start conditions. When operating in the cold start mode, the cold start lubricant distribution may reduce lubricant stacking, accelerate lubricant warming, or provide a combination of such functions. Reduced lubricant stacking may be achieved by shutting-off or restricting restricting lubricant flow to one or more work vehicle assemblies under cold start conditions, which are otherwise prone to lubricant stacking. Additionally, accelerated lubricant warming may be achieved by temporarily increasing an output pressure of a lubricant supply pump, thereby requiring the pump to expend greater energy to drive lubricant circulation, with accelerated lubricant warming occurring as a byproduct. The end result is a robust lubricant distribution system, which improves lubrication performance under cold start conditions and lower lubricant temperatures, while otherwise functioning in a default or standard mode at higher lubricant temperatures.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A cold start lubricant distribution system utilized onboard a work vehicle having first and second axle assemblies, the cold start lubricant distribution system comprising:
    a lubricant distribution circuit fluidly interconnecting the first and second axle assemblies;
    a flow divider section included in the lubricant distribution circuit and through which lubricant flow is apportioned between the first and second axle assemblies;
    a lubricant supply pump located in the lubricant distribution circuit upstream of the flow divider section; and
    a lubricant flow modification assembly including a shutoff valve and a variable flow control valve; wherein in a cold start mode:
        the shutoff valve is in a closed position and prevents or substantially prevents lubricant flow from the lubricant supply pump, through the flow divider section, and to the first axle assembly; and
        the variable flow control valve is in position to increase resistance to lubricant flow from the lubricant supply pump to the second axle assembly and accelerate lubricant warming.

2. The cold start lubricant distribution system of claim 1, wherein the work vehicle further includes a work vehicle transmission through which at least one of the first and second axle assemblies is driven; and
    wherein the lubricant distribution circuit fluidly interconnects the work vehicle transmission, the first axle assembly, and the second axle assembly.

3. The cold start lubricant distribution system of claim 1, further comprising:
    a pressure relief valve positioned in the lubricant distribution circuit upstream of the shutoff valve; and
    a flow line included in the lubricant distribution circuit and fluidly coupling an outlet of the pressure relief valve to an inlet of the first axle assembly.

4. The cold start lubricant distribution system of claim 1, further comprising:
    a pressure relief valve positioned in the lubricant distribution circuit upstream of the shutoff valve; and
    a flow line included in the lubricant distribution circuit and fluidly coupling an outlet of the pressure relief valve to an inlet of the second axle assembly.

5. The cold start lubricant distribution system of claim 1, wherein the work vehicle further includes a work vehicle transmission fluidly interconnected with the first and second axle assemblies through the lubricant distribution circuit; and
    wherein the cold start lubricant distribution system further comprises:
        a pressure relief valve positioned in the lubricant distribution circuit upstream of the shutoff valve; and
        a flow line included in the lubricant distribution circuit and fluidly coupling an outlet of the pressure relief valve to an inlet of the work vehicle transmission.

6. The cold start lubricant distribution system of claim 1, wherein the lubricant flow modification assembly further comprises:
    a valve actuator controllable to move the shutoff valve from the open position to the closed position; and
    a controller coupled to the valve actuator and configured to: (i) selectively place the lubricant flow modification assembly in the cold start mode, and (ii) command the valve actuator to move the shutoff valve into the closed position when placing the lubricant flow modification assembly in the cold start mode.

7. The cold start lubricant distribution system of claim 6, further comprising a lubricant temperature sensor configured to monitor a current lubricant temperature;
    wherein the controller is coupled to the lubricant temperature sensor and is configured to selectively place the lubricant flow modification assembly in the cold start mode based, at least in part, on the current lubricant temperature.

8. The cold start lubricant distribution system of claim 1, wherein the lubricant flow modification assembly further comprises a thermostatic actuator coupled to the shutoff valve and configured to move the shutoff valve from the open position to the closed position when a lubricant temperature falls below a minimum threshold value.

9. The cold start lubricant distribution system of claim 1, wherein a restricted minimum lubricant flow is permitted from the lubricant supply pump to the first axle assembly when the shutoff valve is in the closed position.

10. The cold start lubricant distribution system of claim 1, wherein the variable flow control valve has an inlet coupled to the lubricant supply pump, a first outlet fluidly coupled to an inlet of the first axle assembly through the shutoff valve, and a second outlet fluidly coupled to an inlet of the second axle assembly.

11. The cold start lubricant distribution system of claim 10, wherein the variable flow control valve comprises a pressure balance valve to adjust a fraction of lubricant flow apportioned between the first and second outlets of the pressure balance valve in response a pressure differential across the first and second outlets of the pressure balance valve.

12. The cold start lubricant distribution system of claim 10, wherein the lubricant flow modification assembly further comprises a pressure relief valve having an inlet, which is fluidly coupled between the first outlet of the variable flow control valve and an inlet of the shutoff valve.

13. A cold start lubricant distribution system utilized onboard a work vehicle having first and second actively-lubricated work vehicle assemblies, the cold start lubricant distribution system comprising:
    a lubricant distribution circuit fluidly interconnecting the first and second actively-lubricated work vehicle assemblies;
    a flow divider section included in the lubricant distribution circuit and through which lubricant flow is apportioned between the first and second actively-lubricated work vehicle assemblies, wherein the first actively-lubricated work vehicle assembly includes a work vehicle axle;
    a lubricant supply pump located in the lubricant distribution circuit upstream of the flow divider section; and
    a lubricant flow modification assembly operable in a cold start mode in which the lubricant flow modification assembly reduces a volume of lubricant flow supplied to the work vehicle axle through the flow divider section relative to a volume of lubricant flow supplied to the second actively-lubricated work vehicle assembly through the flow divider section, wherein the lubricant flow modification assembly comprises:

a shutoff valve movable between a closed position and an open position, wherein the shutoff valve, when in the closed position, prevents or substantially prevents lubricant flow from the lubricant supply pump, through the flow divider section, and to the first actively-lubricated work vehicle assembly, a valve actuator controllable to move the shutoff valve from the open position to the closed position;

a sensor providing data indicative of a current rotational rate of the work vehicle axle; and a controller coupled to the valve actuator and configured to: (i) selectively place the lubricant flow modification assembly in the cold start mode, and (ii) command the valve actuator to move the shutoff valve into the closed position when placing the lubricant flow modification assembly in the cold start mode;

wherein the controller is coupled to the sensor and is configured to selectively place the lubricant flow modification assembly in the cold start mode based, at least in part, on the current rotational rate of the work vehicle axle.

14. A work vehicle, comprising:
an actively-lubricated front axle assembly;
an actively-lubricated rear axle assembly; and
a cold start lubricant distribution system, comprising:
- a lubricant distribution circuit fluidly interconnecting the actively-lubricated front and rear axle assemblies;
- a flow divider section included in the lubricant distribution circuit and through which lubricant flow is apportioned between the actively-lubricated front and rear axle assemblies;
- a lubricant supply pump located in the lubricant distribution circuit upstream of the flow divider section; and
- a lubricant flow modification assembly including a shutoff valve and a variable flow control valve; wherein in a cold start mode:
    - the shutoff valve is in a closed position and prevents or substantially prevents lubricant flow from the lubricant supply pump, through the flow divider section, and to the actively-lubricated front axle assembly; and
    - the variable flow control valve is in position to increase resistance to lubricant flow from the lubricant supply pump to the actively-lubricated rear axle assembly and accelerate lubricant warming.

* * * * *

UNITED STATES PATENT AND TRADEMARK OFFICE
CERTIFICATE OF CORRECTION

| | | |
|---|---|---|
| PATENT NO. | : 11,585,428 B2 | |
| APPLICATION NO. | : 17/014562 | |
| DATED | : February 21, 2023 | |
| INVENTOR(S) | : Reid et al. | |

It is certified that error appears in the above-identified patent and that said Letters Patent is hereby corrected as shown below:

On the Title Page

Item [56], Column 2, Line 2, for 'ref. FR 8057917 A1' delete "FR 8057917 A1" and insert -- FR 3057917 A1 --, therefor.

Signed and Sealed this
Second Day of May, 2023

Katherine Kelly Vidal
*Director of the United States Patent and Trademark Office*